United States Patent
Kanesaka et al.

(10) Patent No.: US 11,584,862 B2
(45) Date of Patent: Feb. 21, 2023

(54) INK COMPOSITION, FILM, AND DISPLAY

(71) Applicant: Sumitomo Chemical Company, Limited, Tokyo (JP)

(72) Inventors: Sho Kanesaka, Ichihara (JP); Takeshi Miyamoto, Tsukuba (JP); Shota Naito, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 428 days.

(21) Appl. No.: 16/632,938

(22) PCT Filed: Jul. 26, 2018

(86) PCT No.: PCT/JP2018/028074
§ 371 (c)(1),
(2) Date: Jan. 22, 2020

(87) PCT Pub. No.: WO2019/022195
PCT Pub. Date: Jan. 31, 2019

(65) Prior Publication Data
US 2020/0239713 A1     Jul. 30, 2020

(30) Foreign Application Priority Data

Jul. 28, 2017   (JP) .............................. JP2017-146319

(51) Int. Cl.
*C09D 11/03*   (2014.01)
*C09D 11/107*  (2014.01)
(Continued)

(52) U.S. Cl.
CPC ............ *C09D 11/03* (2013.01); *C09D 11/107* (2013.01); *B82Y 30/00* (2013.01); *B82Y 40/00* (2013.01); *C07F 7/24* (2013.01)

(58) Field of Classification Search
CPC ...................................................... B82Y 30/00
See application file for complete search history.

(56) References Cited

U.S. PATENT DOCUMENTS

| 2015/0075397 A1 | 3/2015 | Gresty et al. |
| 2017/0009090 A1 | 1/2017 | Haghzadeh et al. |
| (Continued) | | |

FOREIGN PATENT DOCUMENTS

| TW | 201723151 A | 7/2017 |
| WO | 2013/172213 A1 | 11/2013 |
| (Continued) | | |

OTHER PUBLICATIONS

Office Action issued in corresponding Chinese Patent Application No. 201880049454.4 dated Jul. 9, 2020.
(Continued)

*Primary Examiner* — Ian A Rummel
(74) *Attorney, Agent, or Firm* — Morgan, Lewis & Bockius LLP

(57) ABSTRACT

The present invention relates to an ink composition including a semiconductor nanoparticle (1) which contains a perovskite compound, and a curable resin composition (2), in which the ink composition may further include a solvent (3), a value of Z in Formula (a) of Z=(O2+O3+N2+N3)/(C2+C3) is 0.37 or less, O2, N2, and C2 represent the number of O atoms, the number of N atoms, and the number of C atoms, respectively, in the curable resin composition (2), and O3, N3, and C3 represent the number of O atoms, the number of N atoms, and the number of C atoms, respectively in the solvent (3).

10 Claims, 1 Drawing Sheet

(51) Int. Cl.
    *B82Y 30/00*     (2011.01)
    *B82Y 40/00*     (2011.01)
    *C07F 7/24*     (2006.01)

(56) References Cited

U.S. PATENT DOCUMENTS

| | | |
|---|---|---|
| 2017/0121598 A1 | 5/2017 | Min et al. |
| 2018/0208840 A1 | 7/2018 | Luchinger et al. |
| 2019/0002719 A1* | 1/2019 | Pousthomis ......... C09D 11/033 |

FOREIGN PATENT DOCUMENTS

| | | |
|---|---|---|
| WO | 2017/020137 A1 | 2/2017 |
| WO | 2017020137 A1 † | 2/2017 |
| WO | 2018/028869 A1 | 2/2018 |
| WO | 2018028869 A1 † | 2/2018 |

OTHER PUBLICATIONS

Office Action issued in counterpart Chinese Patent Application No. 201880049454.4 dated Jan. 7, 2021.

International Search Report issued in corresponding International Patent Application No. PCT/JP2018/028074 dated Sep. 25, 2018.

Protesescu et al., "Nanocrystals of Cesium Lead Halide Perovskites ($CsPbX_3$, X=Cl, Br, and I): Novel Optoelectronic Materials Showing Bright Emission with Wide Color Gamut," Nano Letters, 15: 3692-3696 (2015).

Office Action issued in corresponding Taiwanese Patent Application No. 107126161 dated Apr. 8, 2020.

Extended European Search Report issued in related European Patent Application No. 18838670.0 dated Mar. 17, 2021.

Permabond UV681 Safety Data Sheet Mar. 29, 2016.

Third Party Observation EP 18838670.0 with information on Third Party observation against EP 3660109, dated Sep. 22, 2020.

Protesescu et al., "Nanocrystals of Cesium Lead Halide Perovskites ($CsPbX_3$, X=Cl, Br, and I): Novel Optoelectronic Materials Showing Bright Emission with Wide Color Gamut", Nano Letters, vol. 15, 2015, pp. 3692-3696.†

Safety Data Sheet Permabond UV681 dated Mar. 29, 2016.†

\* cited by examiner
† cited by third party

INK COMPOSITION, FILM, AND DISPLAY

TECHNICAL FIELD

The present invention relates to an ink composition, a film, and a display.

Priority is claimed on Japanese Patent Application No. 2017-146319, filed on Jul. 28, 2017, the content of which is incorporated herein by reference.

BACKGROUND ART

In recent years, there is a growing interest in a perovskite compound having high emission intensity as a wavelength conversion material. For example, an ink composition containing a perovskite compound and PMMA has been reported as an ink composition used for preparing a wavelength conversion film (NPL 1).

CITATION LIST

Non-Patent Literature

[NPL 1] Nano Lett. 2015, 15, 3692 to 3696

DISCLOSURE OF INVENTION

Technical Problem

However, the cured product of the ink composition described in NPL 1 does not necessarily have sufficient solvent resistance.

The present invention has been made in consideration of the above-described problem, and an object thereof is to provide an ink composition with excellent solvent resistance of a cured product while maintaining the emission intensity and a film obtained by curing the ink composition.

Solution to Problem

In other words, embodiments of the present invention includes the inventions of [1] to [7] described below.

[1] An ink composition comprising: a semiconductor nanoparticle (1) which contains a perovskite compound; and a curable resin composition (2), in which the ink composition may further comprise a solvent (3), a value of Z in Formula (a) is 0.37 or less.

$$Z=(O2+O3+N2+N3)/(C2+C3) \quad \text{Formula (a):}$$

(O2, N2, and C2 represent the number of O atoms, the number of N atoms, and the number of C atoms, respectively, in the curable resin composition (2), and O3, N3, and C3 represent the number of O atoms, the number of N atoms, and the number of C atoms, respectively in the solvent (3), here, in a case where the ink composition does not contain the solvent (3), O3, N3, and C3 each represent 0)

[2] The ink composition according to [1], in which the curable resin composition (2) contains at least one selected from the group consisting of a low-molecular-weight compound represented by Formula (b-1) and a polymer having a repeating unit represented by Formula (b-2), and a total content ratio of the low-molecular-weight compound and the polymer is 50% by mass or greater in a case where a total mass of the curable resin composition (2) is set to 100% by mass.

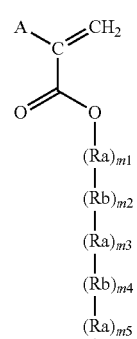

(b-1)

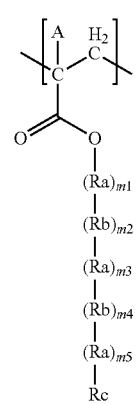

(b-2)

(in Formulae (b-1) and (b-2), A represents a hydrogen atom or a methyl group, m1 represents an integer of 0 to 20, m2 represents an integer of 0 to 2, m3 represents an integer of 0 to 20, m4 represents an integer of 0 to 2, m5 represents an integer of 0 to 20, and a total value of m1 to m5 is 20 or less, Ra represents a methylene group, Rb represents a divalent group represented by any of Formulae (b-31) to (b-38), and in a case where a plurality of Rb's are present, Rb's may be the same as or different from one another, and

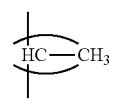

(b-31)

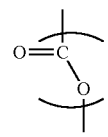

(b-32)

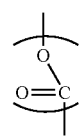

(b-33)

-continued (b-34) 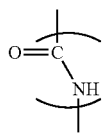

(b-35) 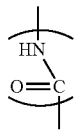

(b-36) 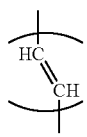

(b-37) 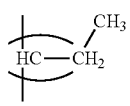

(b-38) 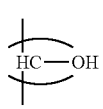

Rc represents a monovalent group represented by any of Formulae (b-41) to (b-48))

(b-41) 

(b-42) 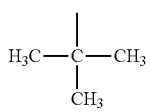

(b-43) 

(b-44) 

(b-45) 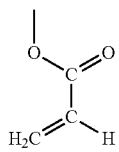

(b-46) 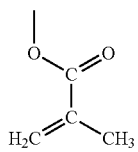

(b-47) 

(b-48) 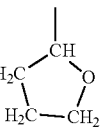

[3] The ink composition according to [2], in which the polymer having a repeating unit represented by Formula (b-2) is a polymer which has 50% by mole or greater of the repeating unit represented by Formula (b-2) in a case where a total amount of repeating units in the polymer is set to 100% by mole.

[4] The composition according to any one of [1] to [3], in which the curable resin composition (2) is a photocurable resin composition.

[5] The composition according to any one of [1] to [4], in which in a case where a total mass of the ink composition is set to 100% by mass, a content ratio of the solvent (3) is 25% by mass or less, and a total content ratio of the semiconductor nanoparticle (1), the curable resin composition (2), and the solvent (3) is 70% by mass or greater.

[6] A film which is obtained by curing the composition according to [4].

[7] A display comprising: the film according to [6].

Advantageous Effects of Invention

According to the present invention, it is possible to provide an ink composition with excellent light-emitting characteristics and solvent resistance.

BEST MODE FOR CARRYING OUT THE INVENTION

<Ink Composition>

Figure 1:
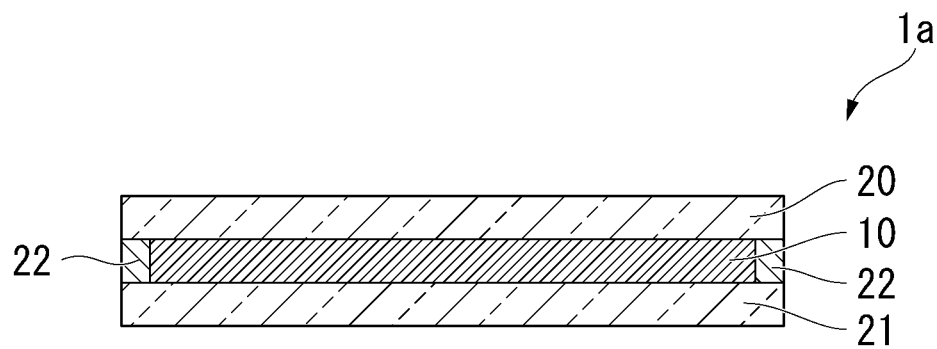
FIG. 1 is a cross-sectional view showing an embodiment of a laminated structure according to the present invention.

An ink composition according to the present embodiment is an ink composition which includes a semiconductor nanoparticle (1) containing a perovskite compound and a curable resin composition (2), and may include a solvent (3), and the value of Z in Formula (a) is less than 0.37. Further, the value of Z in Formula (a) may be 0.37 or less.

$$Z=(O2+O3+N2+N3)/(C2+C3) \quad \text{Formula (a):}$$

(O2, N2, and C2 represent the number of O atoms, the number of N atoms, and the number of C atoms, respectively, in the curable resin composition (2), and O3, N3, and C3 represent the number of O atoms, the number of N atoms, and the number of C atoms, respectively, in the solvent (3), here, in a case where the ink composition does not contain the solvent (3), O3, N3, and C3 each represent 0.)

The ink composition according to the present embodiment may contain at least one selected from the group consisting of a capping ligand (1)-2 and a surface covering material (1)-3.

From the viewpoint of obtaining excellent solvent resistance, the total content ratio of the semiconductor nanoparticle (1), the curable resin composition (2), and the solvent (3) in the ink composition according to the present embodiment is preferably 70% by mass or greater and more preferably 80% by mass or greater with respect to 100% by mass which is the total mass of the ink composition.

According to an aspect of the present invention, the total content ratio of the semiconductor nanoparticle (1), the curable resin composition (2), and the solvent (3) in the ink composition according to the present embodiment is preferably in a range of 70% by mass to 100% by mass and more preferably in a range of 80% by mass to 100% by mass with respect to 100% by mass which is the total mass of the ink composition.

From the viewpoint of the volatility, the content ratio of the solvent (3) in the ink composition according to the present embodiment is preferably 25% by mass or less, more preferably 20% by mass or less, and still more preferably 10% by mass or less with respect to 100% by mass which is the total mass of the ink composition.

According to an aspect of the present invention, the content ratio of the solvent (3) in the ink composition according to the present embodiment is preferably in a range of 0% by mass to 25% by mass and more preferably in a range of 0% by mass to 10% by mass with respect to 100% by mass which is the total mass of the ink composition.

The preferable range of the total content ratio of the semiconductor nanoparticle (1), the curable resin composition (2), and the solvent (3), and the preferable range of the content ratio of the solvent (3) can be combined as desired.

For example, in the ink composition according to the present embodiment, it is preferable that the content ratio of the solvent (3) is 25% by mass or less and the total content ratio of the semiconductor nanoparticle (1), the curable resin composition (2), and the solvent (3) is 70% by mass or greater with respect to 100% by mass which is the total mass of the ink composition.

<<Semiconductor Nanoparticle (1) Containing Perovskite Compound>>

The perovskite compound is a compound which includes constituent components A, B, and X and has a perovskite type crystal structure.

In the present invention, the constituent component A indicates a component positioned at each vertex of a hexahedron having the constituent component B at the center in a perovskite type crystal structure and is a monovalent cation.

The constituent component X indicates a component positioned at each vertex of an octahedron having the constituent component B at the center in the perovskite type crystal structure and is at least one anion selected from the group consisting of a halide ion and a thiocyanate ion.

The constituent component B indicates a component positioned at the centers of the hexahedron where the constituent component A is disposed at each vertex and the octahedron where the constituent component X is disposed at each vertex in the perovskite type crystal structure and is a metal ion.

The perovskite compound having the constituent components A, B, and X is not particularly limited as long as the effects of the present invention are exhibited and may be a compound having any of a three-dimensional structure, a two-dimensional structure, and a quasi-two-dimensional structure.

In a case of the three-dimensional structure, the compositional formula of the perovskite compound is $ABX_{(3+\delta)}$.

In a case of the two-dimensional structure, the compositional formula of the perovskite compound is $A_2BX_{(4+\delta)}$.

Here, the parameter $\delta$ is a number which can be appropriately changed according to the charge balance of B and is in a range of −0.7 to 0.7. From the viewpoint of stabilizing the crystal structure, the parameter $\delta$ is preferably in a range of −0.3 to 0.3, more preferably in a range of −0.1 to 0.1, and still more preferably 0.

As the perovskite compound, a perovskite compound represented by Formula (P1) is preferable.

$$ABX_{(3+\delta)} (-0.7 \leq \delta \leq 0.7) \quad (P1)$$

The constituent component A indicates a component positioned at each vertex of a hexahedron having the constituent component B at the center in a perovskite type crystal structure and is a monovalent cation.

The constituent component X indicates a component positioned at each vertex of an octahedron having the constituent component B at the center in the perovskite type crystal structure and is one or more kinds of anions selected from the group consisting of a halide ion and a thiocyanate ion.

The constituent component B indicates a component positioned at the centers of the hexahedron where the constituent component A is disposed at each vertex and the octahedron where the constituent component X is disposed at each vertex in the perovskite type crystal structure and is a metal ion.

[A]

In the perovskite compound, the constituent component A indicates a component positioned at each vertex of a hexahedron having the constituent component B at the center in a perovskite type crystal structure and is a monovalent cation. Examples of the monovalent cation include a cesium ion, an organic ammonium ion, and an amidinium ion. In a case where the constituent component A is a cesium ion, an organic ammonium ion having 3 or less carbon atoms, or an amidinium ion having 3 or less carbon atoms in the perovskite compound, the perovskite compound typically has a three-dimensional structure represented by $ABX_{(3+\delta)}$. In the perovskite compound, a cesium ion or an organic ammonium ion is preferable as the constituent component A.

Specific examples of the organic ammonium ion as the constituent component A include a cation represented by Formula (A1).

(A1)

In Formula (A1), $R^6$ to $R^9$ each independently represent a hydrogen atom, an alkyl group which may contain an amino group as a substituent, or a cycloalkyl group which may contain an alkyl group or an amino group as a substituent. Here, not all of $R^6$ to $R^9$ simultaneously represent hydrogen atoms.

The alkyl group represented by each of independent $R^6$ to $R^9$ may be linear or branched and may have an amino group as a substituent.

In a case where $R^6$ to $R^9$ represent an alkyl group, the number of carbon atoms of each of independent $R^6$ to $R^9$ is typically in a range of 1 to 20, preferably in a range of 1 to 4, still more preferably in a range of 1 to 3, and even still more preferably 1.

The cycloalkyl group represented by each of independent $R^6$ to $R^9$ may contain an alkyl group or an amino group as a substituent.

The number of carbon atoms of the cycloalkyl group represented by each of independent $R^6$ to $R^9$ is typically in a range of 3 to 30, preferably in a range of 3 to 11, and more preferably in a range of 3 to 8. The number of carbon atoms include the number of carbon atoms in a substituent.

As the group represented by each of independent $R^6$ to $R^9$, a hydrogen atom or an alkyl group is preferable.

A compound having a perovskite type crystal structure of a three-dimensional structure with high emission intensity can be obtained by decreasing the number of alkyl groups and cycloalkyl groups which can be included in Formula (A1) and decreasing the number of carbon atoms in the alkyl group and the cycloalkyl group.

In a case where the number of carbon atoms in the alkyl group or the cycloalkyl group is 4 or more, a compound partially or entirely having a two-dimensional and/or quasi-two-dimensional (quasi-2D) perovskite type crystal structure can be obtained. In a case where a two-dimensional perovskite type crystal structure is laminated at infinity, the structure becomes the same as the three-dimensional perovskite type crystal structure (reference literature: for example, P. P. Boix et al., J. Phys. Chem. Lett. 2015, 6, 898 to 907).

The total number of carbon atoms in the alkyl group as $R^6$ to $R^9$ is preferably in a range of 1 to 4, and the total number of carbon atoms in the cycloalkyl group as $R^6$ to $R^9$ is preferably 3 or 4. It is more preferable that one of $R^6$ to $R^9$ represents an alkyl group having 1 to 3 carbon atoms and three of $R^6$ to $R^9$ represent a hydrogen atom.

Examples of the alkyl group as $R^6$ to $R^9$ include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, a 1-methylbutyl group, an n-hexyl group, a 2-methylpentyl group, a 3-methylpentyl group, a 2,2-dimethylbutyl group, a 2,3-dimethylbutyl group, an n-heptyl group, a 2-methylhexyl group, a 3-methylhexyl group, a 2,2-dimethylpentyl group, a 2,3-dimethylpentyl group, a 2,4-dimethylpentyl group, a 3,3-dimethylpentyl group, a 3-ethylpentyl group, a 2,2,3-trimethylbutyl group, an n-octyl group, an isooctyl group, a 2-ethylhexyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group.

Among these, a methyl group or an ethyl group is preferable, and an methyl group is more preferable as the alkyl group represented by $R^6$ to $R^9$.

As the cycloalkyl group as $R^6$ to $R^9$, a group in which an alkyl group having 3 or more carbon atoms which has been provided as an exemplary example of the alkyl group represented by each of independent $R^6$ to $R^9$ forms a ring is an exemplary example, and examples thereof include a cyclopropyl group, a cyclobutyl group, a cyclopentyl group, a cyclohexyl group, a cycloheptyl group, a cyclooctyl group, a cyclononyl group, a cyclodecyl group, a norbornyl group, an isobornyl group, a 1-adamantyl group, a 2-adamantyl group, and a tricyclodecyl group.

As the organic ammonium ion represented by A, $CH_3NH_3^+$ (also referred to as a methylammonium ion), $C_2H_5NH_3^+$ (also referred to as an ethylammonium ion), or $C_3H_7NH_3^+$ (also referred to as a propylammonium ion) is preferable, $CH_3NH_3^+$ or $C_2H_5NH_3^+$ is more preferable, $CH_3NH_3^+$ is still more preferable.

As the amidinium ion represented by A, an amidinium ion represented by Formula (A2) is an exemplary example.

$$(R^{10}R^{11}N=CH-NR^{12}R^{13})^+ \quad (A2)$$

In Formula (A2), $R^{10}$ to $R^{13}$ each independently represent a hydrogen atom, an alkyl group which may contain an amino group as a substituent, or a cycloalkyl group which may contain an alkyl group or an amino group as a substituent.

The alkyl group represented by each of independent $R^{10}$ to $R^{13}$ may be linear or branched and may have an amino group as a substituent.

The number of carbon atoms in the alkyl group represented by each of independent $R^{10}$ to $R^{13}$ is typically in a range of 1 to 20, preferably in a range of 1 to 4, and still more preferably in a range of 1 to 3.

The cycloalkyl group represented by each of independent $R^{10}$ to $R^{13}$ may contain an alkyl group or an amino group as a substituent.

The number of carbon atoms of the cycloalkyl group represented by each of independent $R^{10}$ to $R^{13}$ is typically in a range of 3 to 30, preferably in a range of 3 to 11, and more preferably in a range of 3 to 8. The number of carbon atoms include the number of carbon atoms in a substituent.

Specific examples of the alkyl group as $R^{10}$ to $R^{13}$ are the same as those provided as exemplary examples of the alkyl group represented by each of independent $R^6$ to $R^9$.

Among these, a methyl group or an ethyl group is preferable, and an methyl group is more preferable as the alkyl group represented by $R^{10}$ to $R^{13}$.

Specific examples of the cycloalkyl group as $R^{10}$ to $R^{13}$ are the same as those provided as exemplary examples of the cycloalkyl group represented by each of independent $R^6$ to $R^9$.

As the group represented by each of independent $R^{10}$ to $R^{13}$, a hydrogen atom or an alkyl group is preferable.

A perovskite compound having a three-dimensional structure with high emission intensity can be obtained by decreasing the number of alkyl groups and cycloalkyl groups which can be included in Formula (A2) and decreasing the number of carbon atoms in the alkyl group and the cycloalkyl group.

In a case where the number of carbon atoms in the alkyl group or the cycloalkyl group is 4 or more, a compound partially or entirely having a two-dimensional and/or quasi-two-dimensional (quasi-2D) perovskite type crystal structure can be obtained. Further, the total number of carbon atoms in the alkyl group as $R^{10}$ to $R^{13}$ is preferably in a range of 1 to 4, and the total number of carbon atoms in the cycloalkyl group as $R^{10}$ to $R^{13}$ is preferably 3 or 4. It is more preferable that $R^{10}$ represents an alkyl group having 1 to 3 carbon atoms and $R^1$ to $R^{13}$ represent a hydrogen atom.

[B]

In the perovskite compound, the constituent component B indicates a component positioned at the centers of the hexahedron where the constituent component A is disposed at each vertex and the octahedron where the constituent component X is disposed at each vertex in the perovskite type crystal structure and is a metal ion. The metal ion as the constituent component B may be a metal ion formed of at least one selected from the group consisting of a monovalent metal ion, a divalent metal ion, and a trivalent metal ion. It is preferable that the constituent component B contains a divalent metal ion and more preferable that the constituent component B contains at least one metal ion selected from the group consisting of lead and tin.

[X]

In the perovskite compound, the constituent component X indicates a component positioned at each vertex of an octahedron having the constituent component B at the center in the perovskite type crystal structure and is at least one anion selected from the group consisting of a halide ion and a thiocyanate ion.

The constituent component X may be at least one anion selected from the group consisting of a chloride ion, a bromide ion, a fluoride ion, an iodide ion, and a thiocyanate ion.

The constituent component X can be appropriately selected according to a desired emission wavelength. For example, the constituent component X may contain a bromide ion.

In a case where the constituent component X is two or more kinds of halide ions, the content ratio of the halide ions can be appropriately selected according to the emission wavelength. For example, a combination of a bromide ion and a chloride ion or a combination of a bromide ion and an iodide ion can be employed.

In the case where the perovskite compound has the three-dimensional structure, the structure has a three-dimensional network of a vertex-sharing octahedron which has B as the center and X as a vertex and is represented by $BX_6$.

In the case where the perovskite compound has the two-dimensional structure, a structure in which a layer formed of two-dimensionally connected $BX_6$ and a layer formed of A are alternately laminated is formed in a case where the octahedron which has B as the center and X as a vertex and is represented by $BX_6$ shares Xs of four vertexes in the same plane.

B represents a metal cation which can have octahedral coordination of X.

In the present specification, the perovskite structure can be confirmed by an X-ray diffraction pattern.

In a case of the compound having the perovskite type crystal structure of the three-dimensional structure, typically, a peak derived from (hkl)=(001) is confirmed at a position where 2θ is in a range of 12° to 18° or a peak derived from (hkl)=(110) is confirmed at a position where 2θ is in a range of 18° to 25° in the X ray diffraction pattern measured. It is more preferable that a peak derived from (hkl)=(001) is confirmed at a position where 2θ is in a range of 13° to 16° or a peak derived from (hkl)=(110) is confirmed at a position where 2θ is in a range of 20° to 23°.

In a case of the compound having the perovskite type crystal structure of the two-dimensional structure, typically, a peak derived from (hkl)=(002) is confirmed at a position where 2θ is in a range of 1° to 10° in the X ray diffraction pattern. It is more preferable that a peak derived from (hkl)=(002) is confirmed at a position where 2θ is in a range of 2° to 8°.

Specific preferred examples of the compound which is represented by $ABX_{(3+\delta)}$ and has the perovskite type crystal structure of the three-dimensional structure in the perovskite compound include $CH_3NH_3PbBr_3$, $CH_3NH_3PbCl_3$, $CH_3NH_3PbI_3$, $CH_3NH_3PbBr_{(3-y)}I_y$ (0<y<3), $CH_3NH_3PbBr_{(3-y)}Cl_y$ (0<y<3), $(H_2N=CH-NH_2)PbBr_3$, $(H_2N=CH-NH_2)PbCl_3$, $(H_2N=CH-NH_2)PbI_3$, $CH_3NH_3Pb_{(1-a)}Ca_aBr_3$ (0<a≤0.7), $CH_3NH_3Pb_{(1-a)}Sr_aBr_3$ (0<a≤0.7), $CH_3NH_3Pb_{(1-a)}La_aBr_{(3+\delta)}$ (0<a≤0.7, 0<δ≤0.7), $CH_3NH_3Pb_{(1-a)}Ba_aBr_3$ (0<a≤0.7), $CH_3NH_3Pb_{(1-a)}Dy_aBr_{(3+\delta)}$ (0<a≤0.7, 0<δ≤0.7), $CH_3NH_3Pb_{(1-a)}Na_aBr_{(3+\delta)}$ (0<a≤0.7, -0.7≤δ<0), $CH_3NH_3Pb_{(1-a)}Li_aBr_{(3+\delta)}$ (0<a≤0.7, -0.7≤δ<0), $CsPb_{(1-a)}Na_aBr_{(3+\delta)}$ (0<a≤0.7, -0.7≤δ<0), $CsPb_{(1-a)}Li_aBr_{(3+\delta)}$ (0<a≤0.7, -0.7≤δ<0), $CH_3NH_3Pb_{(1-a)}Na_aBr_{(3+\delta-y)}I_y$ (0<a≤0.7, -0.7≤δ<0, 0<y<3), $CH_3NH_3Pb_{(1-a)}Li_aBr_{(3+\delta-y)}I_y$ (0<a≤0.7, -0.7≤δ<0, 0<y<3), $CH_3NH_3Pb_{(1-a)}Na_aBr_{(3+\delta-y)}Cl_y$ (0<a≤0.7, -0.7≤δ<0, 0<y<3), $CH_3NH_3Pb_{(1-a)}Li_aBr_{(3+\delta-y)}Cl_y$ (0<a≤0.7, -0.7≤δ<0, 0<y<3), $(H_2N=CH-NH_2)Pb_{(1-a)}Na_aBr_{(3+\delta)}$ (0<a≤0.7, -0.7<δ≤0), $(H_2N=CH-NH_2)Pb_{(1-a)}Li_aBr_{(3+\delta)}$ (0<a≤0.7, -0.7≤δ<0), $(H_2N=CH-NH_2)Pb_{(1-a)}Na_aBr_{(3+\delta-y)}I_y$ (0<a≤0.7, -0.7≤δ<0, 0<y<3), $(H_2N=CH-NH_2)Pb_{(1-a)}Na_aBr_{(3+\delta-y)}Cl_y$ (0<a≤0.7, -0.7≤δ<0, 0<y<3), $CsPbBr_3$, $CsPbCl_3$, $CsPbI_3$, $CsPbBr_{(3-y)}I_y$ (0<y<3), $CsPbBr_{(3-y)}Cl_y$ (0<y<3), $CH_3NH_3PbBr_{(3-y)}Cl_y$ (0<y<3), $CH_3NH_3Pb_{(1-a)}Zn_aBr_3$ (0<a≤0.7), $CH_3NH_3Pb_{(1-a)}Al_aBr_{(3+\delta)}$ (0<a≤0.7, 0<δ≤0.7), $CH_3NH_3Pb_{(1-a)}Co_aBr_3$ (0<a≤0.7), $CH_3NH_3Pb_{(1-a)}Mn_aBr_3$ (0<a≤0.7), $CH_3NH_3Pb_{(1-a)}Mg_aBr_3$ (0<a≤0.7), $CsPb_{(1-a)}Zn_aBr_3$ (0<a≤0.7), $CsPb_{(1-a)}Al_aBr_{(3+\delta)}$ (0<a≤0.7, 0<δ≤0.7), $CsPb_{(1-a)}Co_aBr_3$ (0<a≤0.7), $CsPb_{(1-a)}Mn_aBr_3$ (0<a≤0.7), $CsPb_{(1-a)}Mg_aBr_3$ (0<a≤0.7), $CH_3NH_3Pb_{(1-a)}Zn_aBr_{(3-y)}I_y$ (0<a≤0.7, 0<y<3), $CH_3NH_3Pb_{(1-a)}Al_aBr_{(3+\delta-y)}I_y$ (0<a≤0.7, 0<δ<0.7, 0<y<3), $CH_3NH_3Pb_{(1-a)}Co_aBr_{(3-y)}I_y$ (0<a≤0.7, 0<y<3), $CH_3NH_3Pb_{(1-a)}Mn_aBr_{(3-y)}I_y$ (0<a≤0.7, 0<y<3), $CH_3NH_3Pb_{(1-a)}Mg_aBr_{(3-y)}I_y$ (0<a≤0.7, 0<y<3), $CH_3NH_3Pb_{(1-a)}Zn_aBr_{(3-y)}Cl_y$ (0<a≤0.7, 0<y<3), $CH_3NH_3Pb_{(1-a)}Al_aBr_{(3+\delta-y)}Cl_y$ (0<a≤0.7, 0<δ<0.7, 0<y<3), $CH_3NH_3Pb_{(1-a)}Co_aBr_{(3+\delta-y)}Cl_y$ (0<a≤0.7, 0<y<3), $CH_3NH_3Pb_{(1-a)}Mn_aBr_{(3-y)}Cl_y$ (0<a≤0.7, 0<y<3), $CH_3NH_3Pb_{(1-a)}Mg_aBr_{(3-y)}Cl_y$ (0<a≤0.7, 0<y<3), $(H_2N=CH-NH_2)Zn_aBr_3$ (0<a≤0.7), $(H_2N=CH-NH_2)Mg_aBr_3$ (0<a≤0.7), $(H_2N=CH-NH_2)Pb_{(1-a)}Zn_aBr_{(3-y)}I_y$ (0<a≤0.7, 0<y<3), and $(H_2N=CH-NH_2)Pb_{(1-a)}Zn_aBr_{(3-y)}Cl_y$ (0<a≤0.7, 0<y<3).

According to one aspect of the present invention, as the perovskite compound which is a compound represented by $ABX_{(3+\delta)}$ and having the perovskite type crystal structure of the three-dimensional structure, $CsPbBr_3$ or $CsPbBr_{(3-y)}I_y$ (0<y<3) is preferable.

Specific preferred examples of the compound which is represented by $A_2BX_{(4+\delta)}$ and has the perovskite type crystal structure of the two-dimensional structure in the perovskite compound include $(C_4H_9NH_3)_2PbBr_4$, $(C_4H_9NH_3)_2PbCl_4$, $(C_4H_9NH_3)_2PbI_4$, $(C_7H_{15}NH_3)_2PbBr_4$, $(C_7H_{15}NH_3)_2PbCl_4$, $(C_7H_{15}NH_3)_2PbI_4$, $(C_4H_9NH_3)_2Pb_{(1-a)}Li_aBr_{(4+\delta)}$ (0<a≤0.7, -0.7≤δ<0), $(C_4H_9NH_3)_2Pb_{(1-a)}Na_aBr_{(4+\delta)}$ (0<a≤0.7, -0.7≤δ<0), $(C_4H_9NH_3)_2Pb_{(1-a)}Rb_aBr_{(4+\delta)}$ (0<a≤0.7, -0.7≤δ<0), $(C_7H_{15}NH_3)_2Pb_{(1-a)}Na_aBr_{(4+\delta)}$ (0<a≤0.7, -0.7≤δ<0), $(C_7H_{15}NH_3)_2Pb_{(1-a)}Li_aBr_{(4+\delta)}$ (0<a≤0.7, -0.7≤δ<0), $(C_7H_{15}NH_3)_2Pb_{(1-a)}Rb_aBr_{(4+\delta)}$ (0<a≤0.7, -0.7≤δ<0), $(C_4H_9NH_3)_2Pb_{(1-a)}Na_aBr_{(4+\delta-y)}I_y$ (0<a≤0.7, -0.7≤δ<0, 0<y<4), $(C_4H_9NH_3)_2Pb_{(1-a)}Li_aBr_{(4+\delta-y)}I_y$ (0<a≤0.7, -0.7≤δ<0, 0<y<4), $(C_4H_9NH_3)_2Pb_{(1-a)}Rb_aBr_{(4+\delta-y)}I_y$ (0<a≤0.7, -0.7≤δ<0, 0<y<4), $(C_4H_9NH_3)_2Pb_{(1-a)}Na_aBr_{(4+\delta-y)}Cl_y$ (0<a≤0.7, -0.7≤δ<0, 0<y<4), $(C_4H_9NH_3)_2Pb_{(1-a)}Li_aBr_{(4+\delta-y)}Cl_y$ (0<a≤0.7, -0.7≤δ<0, 0<y<4), $(C_4H_9NH_3)_2Pb_{(1-a)}Rb_aBr_{(4+\delta-y)}Cl_y$ (0<a≤0.7, -0.7≤δ<0, 0<y<4), $(C_4H_9NH_3)_2PbBr_4$, $(C_7H_{15}NH_3)_2PbBr_4$, $(C_4H_9NH_3)_2PbBr_{(4-y)}Cl_y$ (0<y<4), $(C_4H_9NH_3)_2PbBr_{(4-y)}I_y$ (0<y<4), $(C_4H_9NH_3)_2Pb_{(1-a)}Zn_aBr_4$ (0<a≤0.7), $(C_4H_9NH_3)_2Pb_{(1-a)}Mg_aBr_4$ (0<a≤0.7), $(C_4H_9NH_3)_2Pb_{(1-a)}Co_aBr_4$ (0<a≤0.7), $(C_4H_9NH_3)_2Pb_{(1-a)}Mn_aBr_4$ (0<a≤0.7), $(C_7H_{15}NH_3)_2Pb_{(1-a)}Zn_aBr_4$ (0<a≤0.7), $(C_7H_{15}NH_3)_2Pb_{(1-a)}Mg_aBr_4$ (0<a≤0.7), $(C_7H_{15}NH_3)_2Pb_{(1-a)}Co_aBr_4$ (0<a≤0.7), $(C_7H_{15}NH_3)_2Pb_{(1-a)}Mn_aBr_4$ (0<a≤0.7), $(C_4H_9NH_3)_2Pb_{(1-a)}Zn_aBr_{(4-y)}I_y$ (0<a≤0.7, 0<y<4), $(C_4H_9NH_3)_2Pb_{(1-a)}Mg_aBr_{(4-y)}I_y$ (0<a≤0.7, 0<y<4), $(C_4H_9NH_3)_2Pb_{(1-a)}Co_aBr_{(4-y)}I_y$ (0<a≤0.7, 0<y<4), $(C_4H_9NH_3)_2Pb_{(1-a)}Mn_aBr_{(4-y)}I_y$ (0<a≤0.7, 0<y<4), $(C_4H_9NH_3)_2Pb_{(1-a)}Zn_aBr_{(4-y)}Cl_y$ (0<a≤0.7, 0<y<4), $(C_4H_9NH_3)_2Pb_{(1-a)}Mg_aBr_{(4-y)}Cl_y$ ($0<a\leq0.7$, $0<y<4$), $(C_4H_9NH_3)_2Pb_{(1-a)}Co_aBr_{(4-y)}Cl_y$ ($0<a\leq0.7$, $0<y<4$), and $(C_4H_9NH_3)_2Pb_{(1-a)}Mn_aBr_{(4-y)}Cl_y$ ($0<a\leq0.7$, $0<y<4$).

The average particle diameter of the semiconductor nanoparticles (1) contained in the ink composition according to the present embodiment is not particularly limited as long as the effects of the present invention are exhibited. In the ink composition according to the present embodiment, the average particle diameter of the semiconductor nanoparticles (1) is preferably 1 nm or greater, more preferably 2 nm or greater, and still more preferably 3 nm or greater from the viewpoint of satisfactorily maintaining the crystal structure of the semiconductor nanoparticles (1). Further, in the ink composition according to the present embodiment, the average particle diameter of the semiconductor nanoparticles (1) is preferably 10 μm or less, more preferably 1 μm or less, and still more preferably 500 nm or less from the viewpoint of making the semiconductor nanoparticles (1) difficult to be settled out.

The above-described upper limit and lower limit can be combined as desired.

The average particle diameter of the semiconductor nanoparticles (1) contained in the ink composition according to the present embodiment is not particularly limited, but is preferably in a range of 1 nm to 10 m, more preferably in a range of 2 nm to 1 m, and still more preferably 3 nm to 500 nm from the viewpoints of making the semiconductor nanoparticles (1) difficult to be settled out in the composition and satisfactorily maintaining the crystal structure.

The average particle diameter of the semiconductor nanoparticles (1) contained in the ink composition can be measured using, for example, a scanning electron microscope (hereinafter, also referred to as a SEM) or a transmission electron microscope (hereinafter, also referred to as a TEM). Specifically, the average particle diameter can be acquired by observing the Feret diameter of twenty semiconductor nanoparticles (1) contained in the ink composition using a TEM or a SEM and calculating the average Feret diameter of the semiconductor nanoparticles (1) which is an average value of the obtained values. The "Feret diameter" in the present specification indicates the maximum distance between two straight lines parallel to each other which interpose the observation target therebetween on a TEM or SEM image.

The median diameter ($D_{50}$) of the semiconductor nanoparticle (1) contained in the ink composition according to the present embodiment is not particularly limited as long as the effects of the present invention are exhibited. In the ink composition according to the present embodiment, the median diameter $D_{50}$ of the semiconductor nanoparticle (1) is preferably 3 nm or greater, more preferably 4 nm or greater, and still more preferably 5 nm or greater from the viewpoint of satisfactorily maintaining the crystal structure. Further, in the ink composition according to the present embodiment, the median diameter ($D_{50}$) of the semiconductor nanoparticle (1) is preferably 5 μm or less, more preferably 500 nm or less, and still more preferably 100 nm or less from the viewpoint of making the semiconductor nanoparticle (1) difficult to be settled out.

According to another aspect of the present invention, the median diameter ($D_{50}$) of the semiconductor nanoparticle (1) contained in the ink composition is preferably in a range of 3 nm to 5 μm, more preferably in a range of 4 nm to 500 nm, and still more preferably in a range of 5 nm to 100 nm.

In the present specification, the median diameter ($D_{50}$) of the semiconductor nanoparticle (1) contained in the ink composition can be measured using, for example, a TEM or a SEM.

Specifically, the median diameter ($D_{50}$) thereof can be acquired based on distribution of the Feret diameters of twenty semiconductor nanoparticles (1) contained in the ink composition observed using a TEM or a SEM.

The content ratio of the perovskite compound to the total mass of the semiconductor nanoparticles according to the present embodiment is typically in a range of 1% to 100% by mass, preferably in a range of 10% to 100% by mass, and more preferably in a range of 70% to 100% by mass.

The content ratio of the semiconductor nanoparticles (1) to the total mass of the ink composition according to the present embodiment is not particularly limited as long as the effects of the present invention is exhibited, but is preferably 50% by mass or less, more preferably 5% by mass or less, and still more preferably 1% by mass or less from the viewpoints of making the semiconductor nanoparticles containing a perovskite compound difficult to aggregate and preventing the concentration quenching. Further, from the viewpoint of obtaining an excellent quantum yield, the content ratio of the semiconductor nanoparticles (1) to the total mass of the ink composition is preferably 0.0001% by mass or greater, more preferably 0.0005% by mass or greater, and still more preferably 0.001% by mass or greater.

The above-described upper limit and lower limit can be combined as desired.

The content ratio of the semiconductor nanoparticles (1) to the total mass of the ink composition is typically in a range of 0.0001% to 50% by mass.

The content ratio of the semiconductor nanoparticles (1) to the total mass of the ink composition is preferably in a range of 0.0001% by mass to 5% by mass and more preferably in a range of 0.0005% by mass to 2% by mass.

In the ink composition according to the present embodiment, the composition in which the content ratio of the semiconductor nanoparticles (1) to the total mass of the ink composition is in the above-described range is preferable from the viewpoints of making the semiconductor nanoparticles (1) difficult to aggregate and exhibiting an excellent light-emitting property.

The content ratio of the curable resin composition (2) to the total mass of the ink composition according to the present embodiment is not particularly limited as long as the effects of the present invention is exhibited, but is preferably 99% by mass or less from the viewpoint of improving the solvent resistance of the cured product while maintaining the emission intensity. Further, from the viewpoint of improving the solvent resistance of the cured product while maintaining the emission intensity, the content ratio of the curable resin composition (2) to the total mass of the ink composition is preferably 0.1% by mass or greater, more preferably 1% by mass or greater, and still more preferably 10% by mass or greater.

The above-described upper limit and lower limit can be combined as desired.

The content ratio of the curable resin composition (2) to the total mass of the ink composition is typically in a range of 0.1% to 99% by mass.

The content ratio of the curable resin composition (2) to the total mass of the ink composition is preferably in a range of 1% by mass to 99% by mass and more preferably in a range of 10% by mass to 99% by mass.

In the ink composition according to the present embodiment, the composition in which the content ratio of the curable resin composition (2) to the total mass of the ink composition is in the above-described range is preferable from the viewpoint of improving the solvent resistance of the cured product while maintaining the emission intensity.

The total content ratio of the semiconductor nanoparticles (1) and the curable resin composition (2) to the total mass of the ink composition according to the present embodiment is not particularly limited as long as the effects of the present invention is exhibited, but is preferably 99% by mass or less from the viewpoint of improving the solvent resistance of the cured product while maintaining the emission intensity. Further, from the viewpoint of improving the solvent resistance of the cured product while maintaining the emission intensity, the total content ratio of the semiconductor nanoparticles (1) and the curable resin composition (2) to the total mass of the ink composition is preferably 0.1% by mass or greater, more preferably 1% by mass or greater, and still more preferably 10% by mass or greater.

The above-described upper limit and lower limit can be combined as desired.

The total content ratio of the semiconductor nanoparticles (1) and the curable resin composition (2) to the total mass of the ink composition is typically in a range of 0.1% to 99% by mass.

The total content ratio of the semiconductor nanoparticles (1) and the curable resin composition (2) to the total mass of the ink composition is preferably in a range of 1% by mass to 99% by mass and more preferably in a range of 10% by mass to 99% by mass.

In the ink composition according to the present embodiment, the composition in which the total content ratio of the semiconductor nanoparticles (1) and the curable resin composition (2) to the total mass of the ink composition is in the above-described range is preferable from the viewpoint of improving the solvent resistance of the cured product while maintaining the emission intensity.

At least some semiconductor nanoparticles (1) containing a perovskite compound may be covered with the following capping ligand (1)-2 and/or the surface covering material (1)-3.

<<Capping Ligand (1)-2>>

The ink composition according to the present embodiment may contain a capping ligand in order to improve the dispersibility of the semiconductor nanoparticles (1) and to improve the light-emitting characteristics.

Along with the ammonia, the amine, and the carboxylic acid, the ink composition according to the present embodiment may contain at least one compound or ion selected from the group consisting of salts and ions thereof as the form which can be employed by the compound as capping ligand.

That is, the ink composition according to the present embodiment may contain at least one compound or ion selected from the group consisting of ammonia, an amine, a carboxylic acid, a salt of the ammonia, a salt of the amine, a salt of the carboxylic acid, an ion of the ammonia, an ion of the amine, and an ion of the carboxylic acid.

The ammonia, the amine, the carboxylic acid, and the salts and the ions thereof typically function as capping ligands. The "capping ligand" is a compound having a function of being adsorbed on the surface of the semiconductor nanoparticles (1) and stably dispersing the semiconductor nanoparticles (1) in the ink composition. Examples of the ions or salts (such as an ammonia salt) of the ammonia or amine include an ammonium cation represented by Formula (A1'), an ammonium salt containing the ammonium cation, and an amine obtained by removing any one group as $R^1$ to $R^4$ from an ammonium cation represented by Formula (A1'). Examples of the ions or salts (such as a carboxylate) of the carboxylic acid include a carboxylate anion represented by Formula (A2'), a carboxylate salt containing the carboxylate anion, and a carboxylic acid in which a proton is bonded to a carboxylate anion represented by Formula (A2'). The ink composition according to the present embodiment may contain any one or both of an ammonium salt and a carboxylate.

The capping ligand may be an ammonium cation represented by Formula (A1') or an ammonium salt containing the ammonium cation.

(A1')

In Formula (A1'), $R^1$ to $R^3$ represent a hydrogen atom, and $R^4$ represents a hydrogen atom or a monovalent hydrocarbon group. The hydrocarbon group represented by $R^4$ may be a saturated hydrocarbon group (that is, an alkyl group or a cycloalkyl group) or an unsaturated hydrocarbon group.

The alkyl group represented by $R^4$ may be linear or branched.

The number of carbon atoms of the alkyl group represented by $R^4$ is typically in a range of 1 to 20, preferably in a range of 5 to 20, and more preferably in a range of 8 to 20.

The cycloalkyl group represented by $R^4$ may contain an alkyl group as a substituent. The number of carbon atoms in the cycloalkyl group is typically in a range of 3 to 30, preferably in a range of 3 to 20, and more preferably in a range of 3 to 11. The number of carbon atoms include the number of carbon atoms in a substituent.

The unsaturated hydrocarbon group as $R^4$ may be linear or branched.

The number of carbon atoms in the unsaturated hydrocarbon group as $R^4$ is typically in a range of 2 to 20, preferably in a range of 5 to 20, and more preferably in a range of 8 to 20.

It is preferable that $R^4$ represents a hydrogen atom, an alkyl group, or an unsaturated hydrocarbon group.

As the unsaturated hydrocarbon group, an alkenyl group is preferable.

It is preferable that $R^4$ represents an alkenyl group having 8 to 20 carbon atoms.

Specific examples of the alkyl group as $R^4$ include those provided as exemplary examples of the alkyl group represented by $R^6$ to $R^9$.

Specific examples of the cycloalkyl group as $R^4$ include those provided as exemplary examples of the cycloalkyl group represented by $R^6$ to $R^9$.

As the alkenyl group represented by $R^4$, a group in which any one single bond (C—C) between carbon atoms is substituted with a double bond (C═C) in the linear or branched alkyl group as $R^6$ to $R^9$ is an exemplary example, and the position of the double bond is not limited.

Preferred examples of such an alkenyl group include an ethenyl group, a propenyl group, a 3-butenyl group, a 2-butenyl group, a 2-pentenyl group, a 2-hexenyl group, a 2-nonenyl group, a 2-dodecenyl group, and a 9-octadecenyl group.

In a case of the ammonium cation forms a salt, the counter anion is not particularly limited, and preferred examples thereof include halide ions such as Br⁻, Cl⁻, I⁻, and F⁻; and carboxylate ions.

Preferred examples of the ammonium cation represented by Formula (A1') and the ammonium salt containing a counter anion include an n-octylammonium salt and an oleyl ammonium salt.

The capping ligand may be a carboxylate anion represented by Formula (A2') or a carboxylate containing the carboxylate anion.

In Formula (A2'), $R^5$ represents a monovalent hydrocarbon group. The hydrocarbon group represented by $R^5$ may be a saturated hydrocarbon group (that is, an alkyl group or a cycloalkyl group) or an unsaturated hydrocarbon group.

The alkyl group represented by $R^5$ may be linear or branched. The number of carbon atoms of the alkyl group represented by $R^5$ is typically in a range of 1 to 20, preferably in a range of 5 to 20, and more preferably in a range of 8 to 20.

The cycloalkyl group represented by $R^5$ may contain an alkyl group as a substituent. The number of carbon atoms in the cycloalkyl group is typically in a range of 3 to 30, preferably in a range of 3 to 20, and more preferably in a range of 3 to 11. The number of carbon atoms include the number of carbon atoms in a substituent.

The unsaturated hydrocarbon group as $R^5$ may be linear or branched.

The number of carbon atoms in the unsaturated hydrocarbon group as $R^5$ is typically in a range of 2 to 20, preferably in a range of 5 to 20, and more preferably in a range of 8 to 20.

It is preferable that $R^5$ represents an alkyl group or an unsaturated hydrocarbon group. As the unsaturated hydrocarbon group, an alkenyl group is preferable.

Specific examples of the alkyl group as $R^5$ include those provided as exemplary examples of the alkyl group represented by $R^6$ to $R^9$.

Specific examples of the cycloalkyl group as $R^5$ include those provided as exemplary examples of the cycloalkyl group represented by $R^6$ to $R^9$.

Specific examples of the alkenyl group as $R^5$ include those provided as exemplary examples of the alkenyl group represented by $R^4$.

Among these, a 9-octadecenyl group is preferable as the alkenyl group represented by $R^5$.

As the carboxylate anion represented by Formula (A2'), an oleate anion is preferable.

In a case where the carboxylate anion forms a salt, the counter cation is not particularly limited, and preferred examples thereof include an alkali metal ion, an alkaline earth metal cation, and an ammonium cation.

<<Surface Covering Material (1)-3>>

The ink composition according to the present embodiment may contain a surface covering material in order to protect the surface of the semiconductor nanoparticles (1) and improve light-emitting characteristics.

The surface covering material may be a material which can cover the semiconductor nanoparticles (1).

Examples of the surface covering material include a compound containing a silicon atom.

Examples of the compound containing a silicon atom include silicon alkoxide, tetraalkoxide silane such as tetraethoxysilane or tetramethoxysilane, and trialkoxysilane such as methyl trimethoxysilane, methyl triethoxysilane, or phenyl triethoxysilane.

The compound containing a silicon atom may be a silicon-containing alkoxide compound that contains an organic functional group. Specific examples thereof include mercaptopropyl triethoxysilane and aminopropyl triethoxysilane.

The compound containing a silicon atom may be a silazane or modified product thereof.

It is preferable that the compound containing a silicon atom is a silazane or modified product thereof.

The coverage of surface covering material that covers the semiconductor nanoparticles (1) is preferably in a range of 1% to 100%, more preferably in a range of 3% to 100% by mass, and still more preferably in a range of 10% to 100%.

The coverage of surface covering material that covers the semiconductor nanoparticles (1) can be acquired by observing the semiconductor nanoparticles (1) covered with the surface covering material using a TEM or a SEM and performing energy dispersive X-ray analysis (EDX). Specifically, the coverage can be acquired by acquiring the range where elements derived from the surface covering material are present and the range where the entirety of the particles are present based on EDX and calculating ((range where elements derived from surface covering material are present/range where entirety of particles are present)×100).

The silazane may be linear, branched, or cyclic. Further, the silazane may be low molecular or high molecular (in the present specification, also referred to as a polysilazane).

The "low-molecular-weight" in the present specification indicates that the number average molecular weight is less than 600, and the "high-molecular-weight" indicates that the number average molecular weight is in a range of 600 to 2000.

In the present specification, the "number average molecular weight" indicates a value in terms of polystyrene to be measured according to a gel permeation chromatography (GPC) method.

For example, a low-molecular-weight silazane represented by Formula (B1) or (B2) or a polysilazane which has a constituent unit represented by Formula (B3) or has a structure represented by Formula (B4) is preferable.

The silazane may be used by performing silica modification according to the following method.

The silazane contained in the composition according to the embodiment may be a modified product of a silazane which has been modified according to the following method.

The modification indicates that a Si—O—Si bond is formed by substituting N with O in at least some Si—N—Si bonds contained in the silazane, and the modified product of the silazane indicates a compound having a Si—O—Si bond.

As the modified product of the silazane, a low-molecular-weight compound in which at least one N in Formula (B1) or (B2) is substituted with O, a high-molecular-weight compound in which at least one N in a polysilazane having a constituent unit represented by Formula (B3) is substituted with O, or a high-molecular-weight compound in which at least one N in a polysilazane having a structure represented by Formula (B4) is substituted with O is preferable.

The ratio of the number of substituted Os is preferably in a range of 0.1% to 100%, more preferably in a range of 10% to 98%, and still more preferably in a range of 30% to 95% with respect to the total amount of N in Formula (B2).

The ratio of the number of substituted Os is preferably in a range of 0.1% to 100%, more preferably in a range of 10% to 98%, and still more preferably in a range of 30% to 95% with respect to the total amount of N in Formula (B3).

The ratio of the number of substituted Os is preferably in a range of 0.1% to 99%, more preferably in a range of 10% to 97%, and still more preferably in a range of 30% to 95% with respect to the total amount of N in Formula (B4).

The modified product of a silazane may be used alone or in the form of a mixture of two or more kinds thereof.

The number of Si atoms, the number of N atoms, and the number of O atoms contained in the silazane or modified product thereof can be calculated according to nuclear magnetic resonance spectroscopy (NMR), X-ray photoelectron spectroscopy (XPS), or energy dispersive X-ray analysis (EDX) using a transmission electron microscope (TEM).

According to a particularly preferable method, the calculation can be made by measuring the number of Si atoms, the number of N atoms, and the number of O atoms in the ink composition according to the X-ray photoelectron spectroscopy (XPS).

The ratio of the number of O atoms to the number of N atoms contained in the silazane and modified product thereof to be measured according to the above-described method is preferably in a range of 0.1% to 99%, more preferably in a range of 10% to 95%, and still more preferably 30% to 90%.

At least part of the silazane or modified product thereof may be adsorbed by the perovskite compound contained in the composition or may be dispersed in the composition.

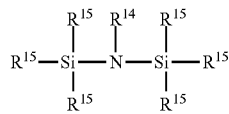
(B1)

In Formula (B1), $R^{14}$ and a plurality of $R^{15}$'s each independently represent a hydrogen atom, an alkyl group having 1 to 20 carbon atoms, an alkenyl group having 1 to 20 carbon atoms, a cycloalkyl group having 3 to 20 carbon atoms, an aryl group having 6 to 20 carbon atoms, or an alkylsilyl group having 1 to 20 carbon atoms. The alkyl group having 1 to 20 carbon atoms, the alkenyl group having 1 to 20 carbon atoms, the cycloalkyl group having 3 to 20 carbon atoms, the aryl group having 6 to 20 carbon atoms, or the alkylsilyl group having 1 to 20 carbon atoms may have a substituent such as an amino group. A plurality of $R^{15}$'s may be the same as or different from one another.

Examples of the low-molecular-weight silazane represented by Formula (B1) include 1,3-divinyl-1,1,3,3-tetramethyldisilazane, 1,3-diphenyltetramethyldisilazane, and 1,1,1,3,3,3-hexamethyldisilazane.

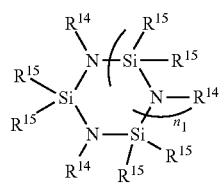
(B2)

In Formula (B2), $R^{14}$ and $R^{15}$ each have the same definition as described above.

A plurality of $R^{14}$'s may be the same as or different from one another.

A plurality of $R^{15}$'s may be the same as or different from one another.

$n_1$ represents an integer of 1 to 20. $n_1$ may represent an integer of 1 to 10 or 1 or 2.

Examples of the low-molecular-weight silazane represented by Formula (B2) include octamethylcyclotetrasilazane, 2,2,4,4,6,6,-hexamethylcyclotrisilazane, and 2,4,6-trimethyl-2,4,6-trivinylcyclotrisilazane.

As the low-molecular-weight silazane, octamethylcyclotetrasilazane or 1,3-diphenyltetramethyldisilazane is preferable, and octamethylcyclotetrasilazane is more preferable.

The polysilazane is a polymer compound having a Si—N—Si bond and is not particularly limited, and examples thereof include a polymer compound having a constituent unit represented by Formula (B3). The constituent unit represented by Formula (B3) which is contained in the polysilazane may be used alone or in combination of a plurality of kinds thereof.

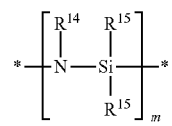
(B3)

In Formula (B3), $R^{14}$ and $R^{15}$ each have the same definition as described above.

The symbol "*" represents a bonding site. The bonding site of the N atom at the terminal may have the same substituent as that of $R^{14}$, and the bonding site of the Si atom at the terminal may have the same substituent as that of $R^{15}$.

A plurality of $R^{14}$'s may be the same as or different from one another.

A plurality of $R^{15}$'s may be the same as or different from one another.

m represents an integer of 2 to 10000.

The polysilazane having a constituent unit represented by Formula (B3) may be a perhydropolysilazane in which all of $R^{14}$'s and $R^{15}$'s represent a hydrogen atom.

The polysilazane having a constituent unit represented by Formula (B3) may be an organopolysilazane in which at least one $R^{15}$ represents a group other than the hydrogen atom. According to the application thereof, the perhydropolysilazane or organopolysilazane may be appropriately selected or can be used by being mixed.

The polysilazane may have a ring structure in a portion of a molecule. For example, the polysilazane may have a structure represented by Formula (B4).

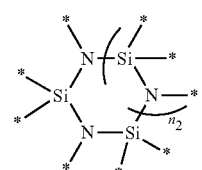
(B4)

In Formula (B4), the symbol "*" represents a bonding site.

The bonding site may be bonded to the bonding site of the constituent unit represented by Formula (B3). In a case where the polysilazane has a plurality of structures represented by Formula (B4) in a molecule, a bonding site of the structure represented by Formula (B4) may be bonded to another bonding site of the structure represented by Formula (B4).

The bonding site of the constituent unit represented by Formula (B3) or the bonding site of the N atom which is not bonded to another bonding site of the structure represented by Formula (B4) may have the same substituent as that of $R^{14}$, and the bonding site of the constituent unit represented by Formula (B3) or the bonding site of the Si atom which is not bonded to another bonding site of the structure represented by Formula (B4) may have the same substituent as that of $R^{15}$.

$n_2$ represents an integer of 1 to 10000. $n_2$ may represent an integer of 1 to 10 or 1 or 2.

The silazane or modified product thereof is not particularly limited. However, from the viewpoints of improving the dispersibility and suppressing aggregation, an organopolysilazane or modified product thereof is preferable. The organopolysilazane may be an organopolysilazane in which at least one of $R^{14}$ and $R^{15}$ in Formula (B3) represents an alkyl group having 1 to 20 carbon atoms, an alkenyl group having 1 to 20 carbon atoms, a cycloalkyl group having 3 to 20 carbon atoms, an aryl group having 6 to 20 carbon atoms, or an alkylsilyl group having 1 to 20 carbon atoms and which has a constituent unit represented by Formula (B3), or an organopolysilazane in which at least one bonding site in Formula (B4) is bonded to $R^{14}$ or $R^{15}$ and at least one of $R^{14}$ and $R^{15}$ represents an alkyl group having 1 to 20 carbon atoms, an alkenyl group having 1 to 20 carbon atoms, a cycloalkyl group having 3 to 20 carbon atoms, an aryl group having 6 to 20 carbon atoms, or an alkylsilyl group having 1 to 20 carbon atoms and which has a structure represented by Formula (B4).

It is preferable that the organopolysilazane is an organopolysilazane in which at least one of $R^{14}$ and $R^{15}$ in Formula (B3) represents a methyl group and has a constituent unit represented by Formula (B3), or a polysilazane in which at least one bonding site in Formula (B4) is bonded to $R^{14}$ or $R^{15}$ and at least one of $R^{14}$ and $R^{15}$ represents a methyl group and which has a structure represented by Formula (B4).

A typical polysilazane is a structure in which a linear structure and a ring structure such as a 6-membered ring or an 8-membered ring are present. The molecular weight thereof is in a range of 600 to 2000 (in terms of polystyrene) as the number average molecular weight (Mn), and the silazane may be a substance in a liquid or solid state depending on the molecular weight thereof. As the polysilazane, a commercially available product may be used, and examples of the commercially available product include NN120-10, NN120-20, NAX120-20, NN110, NAX120, NAX110, NL120A, NL110A, NL150A, NP110, and NP140 (all manufactured by AZ Electronic Materials plc), AZNN-120-20, Durazane (registered trademark) 1500 Slow Cure, Durazane (registered trademark) 1500 Rapid Cure, and Durazane (registered trademark) 1800 (all manufactured by Merck Performance Materials Ltd.), and Durazane (registered trademark) 1033 (manufactured by Merck Performance Materials Ltd.).

As the polysilazane having a constituent unit represented by Formula (B3), AZNN-120-20, Durazane (registered trademark) 1500 Slow Cure or Durazane (registered trademark) 1500 Rapid cure is preferable, and Durazane (registered trademark) 1500 Slow Cure is more preferable.

<Parameter Z>>

The ink composition according to the present embodiment exhibits excellent light-emitting characteristics since the value of Z in Formula (a) is 0.37 or less.

$$Z=(O2+O3+N2+N3)/(C2+C3) \qquad \text{Formula (a):}$$

(O2, N2, and C2 represent the number of O atoms, the number of N atoms, and the number of C atoms, respectively, in the curable resin composition (2), and O3, N3, and C3 represent the number of O atoms, the number of N atoms, and the number of C atoms, respectively, in the solvent (3))

In a case where the curable resin composition (2) is formed of a plurality of kinds of compounds, O2, N2, and C2 are respectively set to the average value of O2, N2, and C2 weighted based on the ratio (% by mass) of the compounds to be formed by setting the total mass of the curable resin composition (2) to 100% by mass with respect to the number of O atoms, the number of N atoms, and the number of C atoms contained in the compounds to be respectively formed.

In a case where the solvent (3) is formed of a plurality of kinds of compounds, O3, N3, and C3 are respectively set to the average value of O3, N3, and C3 weighted based on the ratio (% by mass) of the compounds to be formed by setting the total mass of the solvent (3) to 100% by mass with respect to the number of O atoms, the number of N atoms, and the number of C atoms contained in the compounds to be respectively formed.

That is, O2, N2, C2, O3, N3, and C3 can be defined as follows.

$$O2=\Sigma_{i=1}^{n2} f_{n2} \times O2_{n2} \qquad \text{Formula (a)-21}$$

$$N2=\Sigma_{i=1}^{n2} f_{n2} \times N2_{n2} \qquad \text{Formula (a)-22}$$

$$C2=\Sigma_{i=1}^{n2} f_{n2} \times C2_{n2} \qquad \text{Formula (a)-23}$$

$$O3=\Sigma_{i=1}^{n3} f_{n3} \times O3_{n3} \qquad \text{Formula (a)-31}$$

$$N3=\Sigma_{i=1}^{n3} f_{n3} \times N3_{n3} \qquad \text{Formula (a)-32.}$$

$$C2=\Sigma_{i=1}^{n3} f_{n3} \times C3_{n3} \qquad \text{Formula (a)-33}$$

(n2 represents the number of kinds of the curable resin composition (2) in the curable resin composition (2), $f_{n2}$ represents the ratio (% by mass) of the n2-th compound in a case where the total mass of all compounds contained in the curable resin composition (2) is set as 100% by mass, $O2_{n2}$ represents the number of O atoms contained in the n2-th compound in a case where the total mass of all compounds contained in the curable resin composition (2) is set as 100% by mass, $N2_{n2}$ represents the number of N atoms contained in the n2-th compound in a case where the total mass of all compounds contained in the curable resin composition (2) is set as 100% by mass, $C2_{n2}$ represents the number of C atoms contained in the n2-th compound in a case where the total mass of all compounds contained in the curable resin composition (2) is set as 100% by mass, n3 represents the number of kinds of compounds of the solvent (3), $f_{n3}$ represents the ratio (% by mass) of the n3-th compound in a case where the total mass of all compounds contained in the solvent (3) is set as 100% by mass, $O3_{n3}$ represents the number of O atoms contained in the n3-th compound in a case where the total mass of all compounds contained in the solvent (3) is set as 100% by mass, N3$_{n3}$ represents the number of N atoms contained in the n3-th compound in a case where the total mass of all compounds contained in the solvent (3) is set as 100% by mass, and C3$_{n3}$ represents the number of C atoms contained in the n3-th compound in a case where the total mass of all compounds contained in the solvent (3) is set as 100% by mass.)

In the ink composition according to the present embodiment, the value of Z is preferably 0.27 or less and more preferably 0.20 or less.

According to an aspect of the present invention, in the ink composition according to the present embodiment, the value of Z is preferably in a range of 0.01 to 0.37, more preferably in a range of 0.01 to 0.27, and still more preferably in a range of 0.01 to 0.20.

It is considered that in a case where the value of Z is in the above-described range, since the curing can be made while deterioration of the surface of the perovskite compound is suppressed during polymerization of the ink composition according to the present embodiment, the solvent resistance is obtained with excellent light-emitting characteristics.

As a method for measuring the value of Z, a method for calculating the value by specifying the chemical structure of a compound to be contained using a method of nuclear magnetic resonance spectroscopy (NMR), liquid chromatography, gas chromatography, or ultraviolet-visible spectroscopy can be used.

Further, a method for calculating the value by measuring the content of elements using a technique of X-ray photoelectron spectroscopy (XPS), energy dispersive X-ray analysis (EDX) using a transmission electron microscope (TEM), an element analysis method using an element analyzer, a carbon sulfur analyzer, an oxygen nitrogen hydrogen analyzer, or a fluorescent X-ray device, an ion chromatography method, a titration method, or a polarography method can also be used.

These measuring methods may be used alone or in combination of a plurality of kinds thereof.

As a method for obtaining Z from a mixture of the curable resin composition (2) and the solvent (3) formed by mixing the curable resin composition (2) and the solvent (3) in advance, a method for obtaining Z by acquiring the number of O atoms, the number of N atoms, the number of C atoms in the mixture according to the above-described measuring method and dividing the total number of O atoms and N atoms by the number of C atoms based on Formula (a) is an exemplary example. In this case, the number C atoms can be measured using a carbon sulfur analyzer, the number of O atoms and the number of N atoms can be measured using an oxygen nitrogen hydrogen analyzer or an ion chromatography method.

As a method for obtaining Z from a mixture of the semiconductor nanoparticles (1), the curable resin composition (2), and the solvent (3), formed by mixing the semiconductor nanoparticles (1), the curable resin composition (2), and the solvent (3) in advance, in a case where the semiconductor nanoparticle (1) does not contain O atoms, N atoms, and C atoms, the method for obtaining Z from the mixture of the curable resin composition (2) and the solvent (3) described above can be employed. In a case where the semiconductor nanoparticle (1) does not contain O atoms, N atoms, and C atoms, the atoms contained in the semiconductor nanoparticles (1) are analyzed by chromatography to perform identification and quantification. The value of Z can be obtained by measuring the number of O atoms, the number of N atoms, and the number of C atoms in the mixture of the semiconductor nanoparticles (1), the curable resin composition (2), and the solvent (3) according to the above-described method and dividing the total number of O atoms and N atoms derived from the curable resin composition (2) and the solvent (3) acquired by subtracting the number of O atoms, the number of N atoms, and the number of C atoms derived from the semiconductor nanoparticles (1) from the measured values by the number of C atoms.

<<Curable Resin Composition (2)>>

The curable resin composition contains a curable resin as a main raw material. The curable resin composition may contain a curing agent and an initiator.

The curable resin composition may contain a low-molecular-weight compound (in the present specification, also noted as a curable resin monomer) or may contain a polymer formed by polymerizing a low-molecular-weight compound. The polymer may be an oligomer or a polymer, and it is preferable that the polymer is an oligomer. Here, the oligomer indicates a polymer in which the total number of repetitions is in a range of 2 to 20, and the polymer indicates a polymer in which the total number of repetitions is 21 or greater, with respect to the total number of repeating units of the polymer.

In the present specification, the curable resin indicates a curable monomer and a polymer thereof.

The content ratio of the curable resin contained in the curable resin composition is preferably in a range of 10% to 95% by mass, more preferably in a range of 50% to 95% by mass, and still more preferably in a range of 70% to 95% by mass with respect to the total mass of the curable resin composition.

The content ratio of the curing agent contained in the curable resin composition is preferably in a range of 1% to 50% by mass and more preferably in a range of 5% to 20% by mass with respect to 100% by mass which is the total mass of the curable resin contained in the curable resin composition.

The content ratio of the initiator contained in the curable resin composition is preferably in a range of 0.01% to 20% by mass and more preferably in a range of 0.01% to 5% by mass with respect to 100% by mass which is the total mass of the curable resin contained in the curable resin composition.

The curable resin composition contained in the ink composition according to the present embodiment is not particularly limited as long as the entire ink composition satisfies a condition in which the value of the parameter Z is 0.37 or less.

From the viewpoint of maintaining the light-emitting characteristics, it is preferable that the curable resin composition contains at least one selected from the group consisting of a low-molecular-weight compound represented by Formula (b-1) and a polymer having a repeating unit represented by Formula (b-2) and the total content ratio of the low-molecular-weight compound and the polymer is 50% by mass or greater with respect to 100% by mass which is the total mass of the curable resin composition (2).

According to an aspect of the present invention, it is preferable that the curable resin composition contains at least one selected from the group consisting of a low-molecular-weight compound represented by Formula (b-1) and a polymer having a repeating unit represented by Formula (b-2) and the total content ratio of the low-molecular-weight compound and the polymer is in a range of 50% by mass to 99% by mass with respect to 100% by mass which is the total mass of the curable resin composition (2).

In the curable resin composition, it is more preferable that the content ratio of the low-molecular-weight compound represented by Formula (b-1) is 50% by mass or greater with respect to 100% by mass which is the total mass of the curable resin composition (2) or the content ratio of the polymer having a repeating unit represented by Formula (b-2) is 50% by mass or greater with respect to 100% by mass which is the total mass of the curable resin composition (2).

According to an aspect of the present invention, in the curable resin composition, it is more preferable that the content ratio of the low-molecular-weight compound represented by Formula (b-1) is in a range of 50% by mass to 99% by mass with respect to 100% by mass which is the total mass of the curable resin composition (2) or the content ratio of the polymer having a repeating unit represented by Formula (b-2) is in a range of 50% by mass to 99% by mass with respect to 100% by mass which is the total mass of the curable resin composition (2).

It is preferable that the polymer having a repeating unit represented by Formula (b-2) is a polymer which has 50% by mole or greater of the repeating unit represented by Formula (b-2) and more preferable that the polymer is a polymer having 90% by mole or greater of the repeating unit represented by Formula (b-2), with respect to 100% by mole which is the amount of all repeating units contained in the polymer.

It is preferable that the polymer having a repeating unit represented by Formula (b-2) is a polymer which has 50% by mole to 99% by mole of the repeating unit represented by Formula (b-2) and more preferable that the polymer is a polymer having 90% by mole to 99% by mole of the repeating unit represented by Formula (b-2), with respect to 100% by mole which is the amount of all repeating units contained in the polymer.

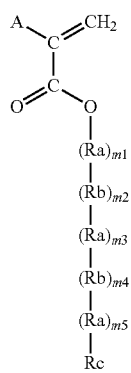

(b-1)

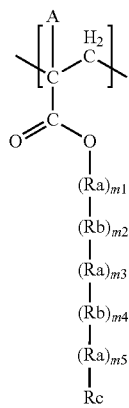

(b-2)

(In Formulae (b-1) and (b-2), A represents a hydrogen atom or a methyl group.

m1 represents an integer of 0 to 20, m2 represents an integer of 0 to 2, m3 represents an integer of 0 to 20, m4 represents an integer of 0 to 2, m5 represents an integer of 0 to 20, and a total value of m1 to m5 is 20 or less.

Ra represents a methylene group.

Rb represents a divalent group represented by any of Formulae (b-31) to (b-38), and in a case where a plurality of Rb's are present, Rb's may be the same as or different from one another.)

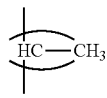

(b-31)

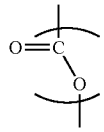

(b-32)

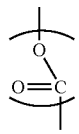

(b-33)

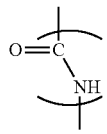

(b-34)

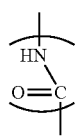

(b-35)

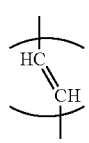

(b-36)

-continued

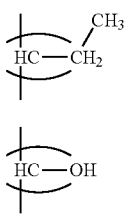
(b-37)

(b-38)

Rc represents a monovalent group represented by any of Formulae (b-41) to (b-48)).

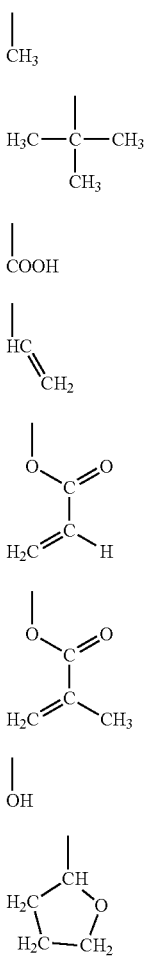

(b-41)

(b-42)

(b-43)

(b-44)

(b-45)

(b-46)

(b-47)

(b-48)

In Formulae (b-1) and (b-2), it is preferable that Rb represents a divalent group represented by any of Formulae (b-32) to (b-35). In a case where a plurality of Rb's are present, Rb's may be the same as or different from one another.

In Formulae (b-1) and (b-2), it is preferable that Rc represents a monovalent group represented by any of Formula (b-41), (b-42), (b-44), (b-45), or (b-46).

In Formulae (b-1) and (b-2), it is preferable that m2 represents 0 or 1, and m4 and m5 represent 0.

In Formulae (b-1) and (b-2), it is preferable that Rb represents a divalent group represented by any of Formulae (b-32) to (b-35), Rc represents a monovalent group represented by any of Formula (b-41), (b-42), (b-44), (b-45), or (b-46), m2 represents 0 or 1, and m4 and m5 represent 0.

From the viewpoint of maintaining the light-emitting characteristics, it is preferable that the lower-molecular-weight compound represented by Formula (b-1) is a low-molecular-weight compound represented by any of Formulae (b-51) to (b-54).

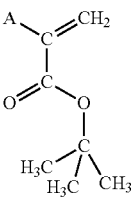
(b-51)

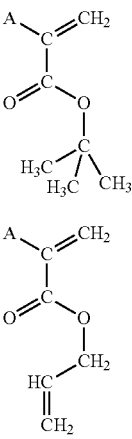

(b-52)

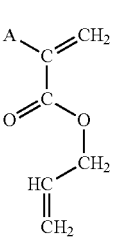
(b-53)

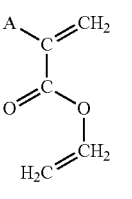
(b-54)

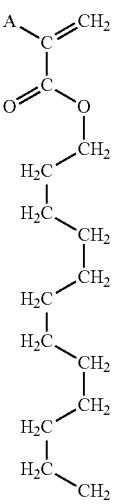

Examples of the curable resin monomer include polyfunctional (meth)acrylate such as (meth)acrylate, epoxy (meth)acrylate, urethane (meth)acrylate, polyester (meth)acrylate, melamine (meth)acrylate, polyether (meth)acrylate, polyethylene glycol (meth)acrylate, or glycerol (meth)acrylate.

These curable resin monomers may be used alone or in the form of a mixture of a plurality of kinds thereof.

A polymer obtained by polymerizing these curable resin monomers may be used.

As the curable resin monomer, at least one selected from the group consisting of (meth)acrylate, urethane (meth)

acrylate, polyester (meth)acrylate, and polyether (meth) acrylate is preferable, and at least one selected from the group consisting of (meth)acrylate and urethane (meth) acrylate is more preferable. Further, a polymer obtained by polymerizing these curable resin monomers may be used.

Examples of the (meth)acrylate include vinyl methacrylate, allyl methacrylate, tert-butyl methacrylate, lauryl methacrylate, 2-ethylhexyl acrylate, isobornyl acrylate, 2-hydroxypropyl acrylate, tetrahydrofurfuryl methacrylate, stearyl methacrylate, and caprolactone acrylate.

These curable resin monomers may be used alone or in the form of a mixture of a plurality of kinds thereof.

A polymer obtained by polymerizing these curable resin monomers may be used.

Curing Agent

The resin composition may contain a curing agent. As the curing agent, a curing agent containing a plurality of functional groups is an exemplary example. Examples of the curing agent containing a plurality of functional groups include trimethylolpropane triacrylate, pentaerythritol tetraacrylate, ditrimethylolpropane tetraacrylate, dipentaerythritol hexaacrylate, and a mercapto compound containing a thiol group. As the trimethylolpropane triacrylate, trimethylolpropane trimethacrylate can be used.

Initiator

The resin composition may contain an initiator.

Specific examples of the initiator include benzoin and derivatives thereof, acetophenone, benzophenone, hydroxybenzophenone, Michler's ketone, α-amyloxime ester, thioxanthone, and derivatives thereof, Irgacure 819, Irgacure 651, and Irgacure 184. These initiators may be used together with a sensitizer. The above-described initiators can be used as sensitizers. Further, a sensitizer such as n-butylamine, triethylamine, or tri-n-butylphosphine can be used at the time of use of an epoxy acrylate-based initiator.

It is preferable that the curable resin composition is a thermosetting resin composition cured by being heated, a photocurable resin composition cured with light, or a thermosetting photocurable resin composition having both characteristics. A photocurable resin composition is more preferable from the viewpoint of being cured in a short time so that the production efficiency is improved.

In a case where a photocurable resin composition or a thermosetting photocurable resin composition is employed as the curable resin composition, light used for curing is not particularly limited, and light having a wavelength such as ultraviolet light or visible light can be used. Light having a wavelength of 150 to 800 nm is preferable, and light having a wavelength of 200 to 500 nm is more preferable. As the light source, a low-pressure mercury lamp, a high-pressure mercury lamp, an ultrahigh-pressure mercury lamp, a chemical lamp, a light-emitting diode (LED) light source, or an excimer laser generator can be used, and an active light ray having a wavelength of 300 nm to 450 nm such as i-line (365 nm), h-line (405 nm), or g-line (436 nm) can be preferably used.

Further, irradiation light can be adjusted through a spectral filter such as a long-wavelength cut filter, a short-wavelength cut filter, or a band pass filter as necessary. The exposure amount is preferably in a range of 1 to 5000 mJ/cm$^2$, more preferably in a range of 10 to 2000 mJ/cm$^2$, and still more preferably in a range of 50 to 500 mJ/cm$^2$.

Examples of the photocurable resin to be cured as described above include known curable resins such as styrene, an acrylate resin, a methacrylate resin, an epoxy resin, a urethane resin, a silicon resin, and monomers and oligomers which become respective raw materials.

<<Solvent (3)>>

The ink composition of the present invention may contain a solvent in addition to the semiconductor nanoparticle (1) and the curable resin composition (2). The solvent is not particularly limited as long as the solvent is a medium in which the parameter Z is in a suitable range and the semiconductor nanoparticles (1) can be dispersed.

In the present specification, the "solvent" indicates a substance (excluding the curable resin composition (2)) that enters a liquid state at 25° C. and 1 atm.

In the present specification, the term "dispersed" indicates a state in which the semiconductor nanoparticles (1) are floated or suspended in a solvent, and some particles may be settled out.

Examples of the solvent include an ester such as methyl formate, ethyl formate, propyl formate, pentyl formate, methyl acetate, ethyl acetate, or pentyl acetate; a ketone such as γ-butyrolactone, acetone, dimethyl ketone, diisobutyl ketone, cyclopentanone, cyclohexanone, or methyl cyclohexanone; an ether such as diethyl ether, methyl-tert-butyl ether, diisopropyl ether, dimethoxymethane, dimethoxyethane, 1,4-dioxane, 1,3-dioxolane, 4-methyldioxolane, tetrahydrofuran, methyl tetrahydrofuran, anisole, or phenetole; an alcohol such as methanol, ethanol, 1-propanol, 2-propanol, 1-butanol, 2-butanol, tert-butanol, 1-pentanol, 2-methyl-2-butanol, methoxypropanol, diacetone alcohol, cyclohexanol, 2-fluoroethanol, 2,2,2-trifluoroethanol, or 2,2,3,3-tetrafluoro-1-propanol; a glycol ether such as ethylene glycol monomethyl ether, ethylene glycol monoethyl ether, ethylene glycol monobutyl ether, ethylene glycol monoethyl ether acetate, or triethylene glycol dimethyl ether; an organic solvent containing an amide group such as N-methyl-2-pyrrolidone, N,N-dimethylformamide, acetamide, or N,N-dimethylacetamide; an organic solvent containing a nitrile group such as acetonitrile, isobutyronitrile, propionitrile, or methoxy acetonitrile; an organic solvent containing a carbonate group such as ethylene carbonate or propylene carbonate; an organic solvent containing a halogenated hydrocarbon group such as methylene chloride or chloroform; an organic solvent containing a hydrocarbon group such as n-pentane, cyclohexane, n-hexane, benzene, toluene, or xylene; and dimethyl sulfoxide.

Among these, an ester such as methyl formate, ethyl formate, propyl formate, pentyl formate, methyl acetate, ethyl acetate, or pentyl acetate; a ketone such as γ-butyrolactone, acetone, dimethyl ketone, diisobutyl ketone, cyclopentanone, cyclohexanone, or methyl cyclohexanone; an ether such as diethyl ether, methyl-tert-butyl ether, diisopropyl ether, dimethoxymethane, dimethoxyethane, 1,4-dioxane, 1,3-dioxolane, 4-methyldioxolane, tetrahydrofuran, methyl tetrahydrofuran, anisole, or phenetole; an organic solvent containing a nitrile group such as acetonitrile, isobutyronitrile, propionitrile, or methoxyacetonitrile; an organic solvent containing a carbonate group such as ethylene carbonate or propylene carbonate; an organic solvent containing a halogenated hydrocarbon group such as methylene chloride or chloroform; or an organic solvent containing a hydrocarbon group such as n-pentane, cyclohexane, n-hexane, benzene, toluene, or xylene is preferable from the viewpoint that the polarity is low and the semiconductor nanoparticle (1) is unlikely to be dissolved therein, and an organic solvent containing a halogenated hydrocarbon group such as methylene chloride or chloroform; or an organic solvent containing a hydrocarbon group such as n-pentane, cyclohexane, n-hexane, benzene, toluene, or xylene is more preferable.

<<Inorganic Fine Particle Additive (Scattering Material)>>

In order to scatter light so that light-emitting characteristics are improved, inorganic fine particles may be added to the ink composition of the present invention. Examples of the inorganic fine particle include inorganic fine particles containing known inorganic compounds such as an oxide and a hydroxide. Among these, from the viewpoint that the perovskite compound efficiently absorbs light passing through the composition, the number of defect sites in the perovskite compound is reduced without deteriorating the perovskite compound, and the probability of excited electrons trapping the defect sites is reduced, an oxide is preferable.

The amount of the inorganic fine particle additive is preferably in a range of 0.1% to 30% by mass, more preferably in a range of 0.5% to 20% by mass, and still more preferably in a range of 1% to 10% by mass with respect to 100 parts by mass of the ink composition In a case where the inorganic fine particle is an oxide, examples of the oxide include known oxides such as aluminum oxide, zinc oxide, niobium oxide, zirconium oxide, titanium oxide, magnesium oxide, and gallium oxide. Among these, the oxide may be aluminum oxide, zinc oxide, or niobium oxide; zinc oxide or niobium oxide; or niobium oxide.

In a case where the inorganic fine particle is aluminum oxide, examples of the aluminum oxide include known alumina oxides such as α-alumina, γ-alumina, θ-alumina, δ-alumina, η-alumina, κ-alumina, and χ-alumina. Among these, the aluminum oxide may be α-alumina or γ-alumina; or α-alumina.

From the viewpoint that the perovskite compound efficiently absorbs light passing through the composition, the number of defect sites in the perovskite compound is reduced without deteriorating the perovskite compound, and the probability of excited electrons trapping the defect sites is reduced, the average particle diameter of the inorganic fine particles is preferably in a range of 150 nm to 30 µm, more preferably in a range of 160 nm to 10 µm, and particularly preferably in a range of 170 nm to 4 µm.

As the method for measuring the average particle diameter of the inorganic fine particles, a method for performing observation using a scanning electron microscope (SEM) or a TEM is an exemplary example. Further, the detailed element distribution can be analyzed by performing EDX measurement using a SEM or a TEM.

The shape of the inorganic fine particle is not particularly limited. The particle diameter of the inorganic fine particle is the size of the outer periphery of a particle and can be calculated as the average size (Feret diameter) of measured longer lengths between the vertical lengths and the horizontal lengths of rectangles circumscribing the figure of the outer peripheries thereof. That is, the average particle diameter of the inorganic fine particles can be obtained by observing the Feret diameters of twenty inorganic fine particles using a TEM and calculating the average Feret diameter which is an average value thereof.

From the viewpoint that the perovskite compound efficiently absorbs light passing through the composition, the number of defect sites in the perovskite compound is reduced without deteriorating the perovskite compound, and the probability of excited electrons trapping the defect sites is reduced, the specific surface area of the inorganic fine particles is preferably in a range of 0.05 m$^2$/g to 100 m$^2$/g, more preferably in a range of 0.1 m$^2$/g to 30 m$^2$/g, and still more preferably in a range of 0.4 m$^2$/g to 15 m$^2$/g.

The specific surface area of the inorganic fine particles can be measured using a specific surface area measuring device (for example, Macsorb, manufactured by Mountech Co., Ltd.) according to the BET method.

<Method for Producing Ink Composition>

Hereinafter, a method for producing the composition of the present invention will be described based on the embodiments. According to the method for producing the ink composition according to the embodiment, the ink composition according to the present embodiment can be produced. Further, the composition of the present invention is not limited to a composition produced by a method for producing an ink composition according to the embodiment described below.

<<Method for Producing Perovskite Compound (1)>>

The perovskite compound can be produced according to a method of a first embodiment or a second embodiment described below with reference to the known literature (Nano Lett. 2015, 15, 3692 to 3696, ACSNano, 2015, 9, 4533 to 4542).

First Embodiment of Method for Producing Perovskite Compound Containing Constituent Components A, B, and X Examples of the method for producing the perovskite compound according to the present invention include a production method including a step of dissolving the constituent component B, the constituent component X, and the constituent component A in a solvent x to obtain a solution g; and a step of mixing the obtained solution g with a solvent y in which the solubility of the perovskite compound therein is lower than that of the solvent x used in the step of obtaining the solution g.

More specific examples thereof include a production method including a step of dissolving a compound that contains the constituent component B and the constituent component X and a compound that contains the constituent component A, or the constituent component A and the constituent component X in a solvent x to obtain a solution g; and a step of mixing the obtained solution g with a solvent y in which the solubility of the perovskite compound therein is lower than that of the solvent x used in the step of obtaining the solution g.

The perovskite compound is precipitated by mixing the obtained solution g with the solvent y in which the solubility of the perovskite compound therein is lower than that of the solvent x used in the step of obtaining the solution g.

Hereinafter, the production method including a step of dissolving a compound that contains the constituent component B and the constituent component X and a compound that contains the constituent component A, or the constituent component A and the constituent component X in a solvent x to obtain a solution g; and a step of mixing the obtained solution g with a solvent y in which the solubility of the perovskite compound therein is lower than that of the solvent x used in the step of obtaining the solution g will be described.

Further, the solubility indicates the solubility at the temperature of carrying out the mixing step.

From the viewpoint of stably dispersing the perovskite compound, it is preferable that the production method includes a step of adding capping ligands.

It is preferable that the capping ligands are added before the mixing step is carried out. The capping ligands may be added to the solution g in which the constituent component A, the constituent component B, and the constituent component X are dissolved; the solvent y in which the solubility of the perovskite compound therein is lower than that of the solvent x used in the step of obtaining the solution g; or both of solvent x and the solvent y.

It is preferable that the production method includes a step of removing coarse particles using a method for carrying out centrifugation or filtration after the mixing step described above. The size of the coarse particles to be removed by the removal step is preferably 10 μm or greater, more preferably 1 μm or greater, and particularly preferably 500 nm or greater.

The step of mixing the solution g with the solvent y described above may be a step (I) of adding the solution g dropwise to the solvent y or a step (II) of adding the solvent y dropwise to the solution g. However, from the viewpoint of improving the dispersibility of the semiconductor nanoparticle (1), the step (I) is preferable.

It is preferable that stirring is performed during dropwise addition from the viewpoint of improving the dispersibility of the semiconductor nanoparticle (1).

In the step of mixing the solution g with the solvent y, the temperature is not particularly limited, but is preferably in a range of −20° C. to 40° C. and more preferably in a range of −5° C. to 30° C. from the viewpoint of ensuring easy precipitation of the semiconductor nanoparticle (1).

Two kinds of solvents x and y with different solubilities in the solvent of the perovskite compound used in the production method are not particularly limited, and examples thereof include two solvents selected from the group consisting of alcohols such as methanol, ethanol, 1-propanol, 2-propanol, 1-butanol, 2-butanol, tert-butanol, 1-pentanol, 2-methyl-2-butanol, methoxypropanol, diacetone alcohol, cyclohexanol, 2-fluoroethanol, 2,2,2-trifluoroethanol, and 2,2,3,3-tetrafluoro-1-propanol; a glycol ether such as ethylene glycol monomethyl ether, ethylene glycol monoethyl ether, ethylene glycol monobutyl ether, ethylene glycol monoethyl ether acetate, or triethylene glycol dimethyl ether; an organic solvent containing an amide group such as N-methyl-2-pyrrolidone, N,N-dimethylformamide, acetamide, or N,N-dimethylacetamide; an ester such as methyl formate, ethyl formate, propyl formate, pentyl formate, methyl acetate, ethyl acetate, or pentyl acetate; a ketone such as γ-butyrolactone, acetone, dimethyl ketone, diisobutyl ketone, cyclopentanone, cyclohexanone, or methyl cyclohexanone; an ether such as diethyl ether, methyl-tert-butyl ether, diisopropyl ether, dimethoxymethane, dimethoxyethane, 1,4-dioxane, 1,3-dioxolane, 4-methyldioxolane, tetrahydrofuran, methyl tetrahydrofuran, anisole, or phenetole; an organic solvent containing a nitrile group such as acetonitrile, isobutyronitrile, propionitrile, or methoxy acetonitrile; an organic solvent containing a carbonate group such as ethylene carbonate or propylene carbonate; an organic solvent containing a halogenated hydrocarbon group such as methylene chloride or chloroform; an organic solvent containing a hydrocarbon group such as n-pentane, cyclohexane, n-hexane, benzene, toluene, or xylene; and dimethyl sulfoxide.

As the solvent x used in the step of obtaining the solution g which is included in the production method, a solvent with a higher solubility in the solvent of the perovskite compound is preferable, and examples thereof include, in a case where the step is performed at room temperature (10° C. to 30° C.), alcohols such as methanol, ethanol, 1-propanol, 2-propanol, 1-butanol, 2-butanol, tert-butanol, 1-pentanol, 2-methyl-2-butanol, methoxypropanol, diacetone alcohol, cyclohexanol, 2-fluoroethanol, 2,2,2-trifluoroethanol, and 2,2,3,3-tetrafluoro-1-propanol; a glycol ether such as ethylene glycol monomethyl ether, ethylene glycol monoethyl ether, ethylene glycol monobutyl ether, ethylene glycol monoethyl ether acetate, or triethylene glycol dimethyl ether; an organic solvent containing an amide group such as N-methyl-2-pyrrolidone, N,N-dimethylformamide, acetamide, or N,N-dimethylacetamide; and dimethyl sulfoxide.

As the solvent y used in the mixing step which is included in the production method, a solvent with a lower solubility in the solvent of the perovskite compound is preferable, and examples thereof include, in a case where the step is performed at room temperature (10° C. to 30° C.), an ester such as methyl formate, ethyl formate, propyl formate, pentyl formate, methyl acetate, ethyl acetate, or pentyl acetate; a ketone such as γ-butyrolactone, acetone, dimethyl ketone, diisobutyl ketone, cyclopentanone, cyclohexanone, or methyl cyclohexanone; an ether such as diethyl ether, methyl-tert-butyl ether, diisopropyl ether, dimethoxymethane, dimethoxyethane, 1,4-dioxane, 1,3-dioxolane, 4-methyldioxolane, tetrahydrofuran, methyl tetrahydrofuran, anisole, or phenetole; an organic solvent containing a nitrile group such as acetonitrile, isobutyronitrile, propionitrile, or methoxy acetonitrile; an organic solvent containing a carbonate group such as ethylene carbonate or propylene carbonate; an organic solvent containing a halogenated hydrocarbon group such as methylene chloride or chloroform; and an organic solvent containing a hydrocarbon group such as n-pentane, cyclohexane, n-hexane, benzene, toluene, or xylene.

A difference in solubility between two kinds of solvents with different solubilities is preferably in a range of (100 μg/100 g of solvent) to (90 g/100 g of solvent) and more preferably in a range of (1 mg/100 g of solvent) to (90 g/100 g of solvent). From the viewpoint of adjusting the difference in solubility to be in a range of (100 μg/100 g of solvent) to (90 g/100 g of solvent), for example, in a case where the mixing step is performed at room temperature (10° C. to 30° C.), it is preferable that the solvent x used in the step of obtaining the solution is an organic solvent containing an amide group such as N,N-dimethylacetamide or dimethyl sulfoxide, and the solvent y used in the mixing step is an organic solvent containing a halogenated hydrocarbon group such as methylene chloride or chloroform or an organic solvent containing a hydrocarbon group such as n-pentane, cyclohexane, n-hexane, benzene, toluene, or xylene.

As a method for extracting the perovskite compound from the obtained dispersion liquid containing the perovskite compound, a method for recovering only the perovskite compound by performing solid-liquid separation is an exemplary example.

Examples of the above-described solid-liquid separation method include a method for performing filtration or the like and a method of using evaporation of a solvent.

Second Embodiment of Method for Producing Perovskite Compound Containing Constituent Components A, B, and X The method for producing the perovskite compound may be a production method including a step of adding the constituent component B, the constituent component X, and the constituent component A to a solvent z at a high temperature and dissolving the components therein to obtain a solution h; and a step of cooling the obtained solution h.

More specifically, a production method including a step of adding a compound containing the constituent component B and the constituent component X, a compound containing the constituent component A, or the constituent component A and the constituent component X to a solvent z at a high temperature and dissolving the components therein to obtain a solution h; and a step of cooling the obtained solution h is an exemplary example.

The step of adding a compound containing the constituent component B and the constituent component X and a compound containing the constituent component A, or the constituent component A and the constituent component X to a solvent z at a high temperature and dissolving the components therein to obtain a solution h may be a step of adding a compound containing the constituent component B and the constituent component X and a compound containing the constituent component A, or the constituent component A and the constituent component X to a solvent z and increasing the temperature to obtain a solution h.

According to the production method, the perovskite compound according to the present invention can be produced by allowing the perovskite compound according to the present invention to precipitate based on the difference in solubility caused by the difference in temperature.

From the viewpoint of stably dispersing the perovskite compound, it is preferable that the production method includes a step of adding capping ligands. It is preferable that the capping ligands are contained in the solution h before the cooling step.

It is preferable that the production method includes a step of removing coarse particles using a method for carrying out centrifugation or filtration after the cooling step. The size of the coarse particles to be removed by the removal step is preferably 10 μm or greater, more preferably 1 μm or greater, and particularly preferably 500 nm or greater.

Here, the solvent z at a high temperature may be a solvent at a temperature at which the compound containing the constituent component B and the constituent component X and the compound containing the constituent component A or the constituent component A and the constituent component X are dissolved. For example, a solvent at 60° C. to 600° C. is preferable, and a solvent at 80° C. to 400° C. is more preferable.

The cooling temperature is preferably in a range of −20° C. to 50° C. and more preferably in a range of −10° C. to 30° C.

The cooling rate is preferably in a range of 0.1° C. to 1500° C./min and more preferably in a range of 10° C. to 150° C./min.

The solvent z used in the production method is not particularly limited as long as the compound containing the constituent component B and the constituent component X and the compound containing the constituent component A or the constituent component A and the constituent component X are dissolved in the solvent, and examples thereof include an ester such as methyl formate, ethyl formate, propyl formate, pentyl formate, methyl acetate, ethyl acetate, or pentyl acetate; a ketone such as γ-butyrolactone, acetone, dimethyl ketone, diisobutyl ketone, cyclopentanone, cyclohexanone, or methyl cyclohexanone; an ether such as diethyl ether, methyl-tert-butyl ether, diisopropyl ether, dimethoxymethane, dimethoxyethane, 1,4-dioxane, 1,3-dioxolane, 4-methyldioxolane, tetrahydrofuran, methyl tetrahydrofuran, anisole, or phenetole; an alcohol such as methanol, ethanol, 1-propanol, 2-propanol, 1-butanol, 2-butanol, tert-butanol, 1-pentanol, 2-methyl-2-butanol, methoxypropanol, diacetone alcohol, cyclohexanol, 2-fluoroethanol, 2,2,2-trifluoroethanol, or 2,2,3,3-tetrafluoro-1-propanol; a glycol ether such as ethylene glycol monomethyl ether, ethylene glycol monoethyl ether, ethylene glycol monobutyl ether, ethylene glycol monoethyl ether acetate, or triethylene glycol dimethyl ether; an organic solvent containing an amide group such as N-methyl-2-pyrrolidone, N,N-dimethylformamide, acetamide, or N,N-dimethylacetamide; an organic solvent containing a nitrile group such as acetonitrile, isobutyronitrile, propionitrile, or methoxy acetonitrile; an organic solvent containing a carbonate group such as ethylene carbonate or propylene carbonate; an organic solvent containing a halogenated hydrocarbon group such as methylene chloride or chloroform; an organic solvent containing a hydrocarbon group such as n-pentane, cyclohexane, n-hexane, benzene, toluene, or xylene; and dimethyl sulfoxide, and 1-octadecene.

As a method for extracting the perovskite compound from the obtained dispersion liquid containing the perovskite compound, a method for recovering only the perovskite compound by performing solid-liquid separation is an exemplary example.

Examples of the above-described solid-liquid separation method include a method for performing filtration or the like and a method of using evaporation of a solvent.

[Method for Modifying Silazane]

Examples of the method for modifying the silazane include known modification methods such as a method for performing modification by irradiation with vacuum ultraviolet rays using an excimer lamp or the like and a method for performing a humidification treatment using water or the like. Among these, the modification treatment through the humidification treatment is preferable from the viewpoint of forming a stronger protective layer.

The wavelength of ultraviolet rays used in the method for radiating ultraviolet rays is typically in a range of 10 to 400 nm, preferably in a range of 10 to 350 nm, and more preferably in a range of 100 nm to 180 nm. Examples of the light source that generates ultraviolet rays include a metal halide lamp, a high pressure mercury lamp, a low pressure mercury lamp, a xenon arc lamp, a carbon arc lamp, an excimer lamp, and UV laser light.

As the method for performing the humidification treatment, a method for reacting water vapor with a silazane may be used.

In a case where the silazane in the ink composition is modified by performing the humidification treatment, for example, the composition may be allowed to stand or be stirred for a certain time under the conditions of a temperature and a humidity described below.

From the viewpoint of improving the dispersibility of the silazane contained in the ink composition, it is preferable that stirring is carried out.

The temperature during the humidification treatment may be a temperature at which the modification sufficiently proceeds and is preferably in a range of 5° C. to 150° C., more preferably in a range of 10° C. to 100° C., and still more preferably in a range of 15° C. to 80° C.

The humidity during the humidification treatment may be a humidity at which the moisture is sufficiently supplied to the silazane in the ink composition and is in a range of 30% to 100%, preferably in a range of 40% to 95%, and more preferably in a range of 60% to 90%.

In the present specification, the "humidity" indicates the relative humidity at a temperature at which the humidification treatment is performed.

The time required for the humidification treatment may be a time at which the modification sufficiently proceeds and is in a range of 10 minutes to 1 week, preferably in a range of 1 hour to 5 days, and more preferably in a range of 12 hours to 3 days.

In the present embodiment, the value of Z can be set to a predetermined value (0.37 or less) by appropriately adjusting the compositional formulae of the curable resin composition (2) and the solvent (3) to be used and the amounts thereof to be used.

<Method for Producing Composition>

Hereinafter, a method for producing the composition of the present invention will be described based on the embodiments. According to the method for producing the composition according to the present embodiment, the composition according to the present invention can be produced. Further, the composition of the present invention is not limited to a composition produced by a method for producing a composition according to the embodiment described below.

As a method for producing the composition containing semiconductor nanoparticles (1) and the curable resin composition (2), a production method including a step of mixing the semiconductor nanoparticles (1) with the curable resin composition (2) is preferable.

Further, as a method for producing the composition containing semiconductor nanoparticles (1), the curable resin composition (2), and the solvent (3), a production method including a step of mixing the semiconductor nanoparticles (1) with the curable resin composition (2) and a step of mixing the mixture of the semiconductor nanoparticles (1) and the curable resin composition (2) with the solvent (3) is preferable.

From the viewpoint of improving the dispersibility, it is preferable that stirring is performed in the mixing step included in the above-described production method.

The temperature in the mixing step included in the above-described production method is not particularly limited, but is preferably in a range of 0° C. to 100° C. and more preferably in a range of 10° C. to 80° C. from the viewpoint of uniformly mixing the mixture.

As a method for producing the composition that further contains the capping ligand (1)-2, the method for producing the composition containing semiconductor nanoparticles (1) and the curable resin composition (2) or the method for producing the composition containing semiconductor nanoparticles (1), the curable resin composition (2), and the solvent (3) can be used in the same manner as described above except that the capping ligand (1)-2 is mixed in any step included in the above-described production method.

In the present embodiment, from the viewpoint of improving the dispersibility of the semiconductor nanoparticles (1), it is preferable that the capping ligand (1)-2 is mixed in any step included in the method for producing the perovskite compound having the constituent components A, B, and X in the component (1) described above. For example, it is preferable that the composition is produced by the following production method (a1) or the following production method (a2).

The production method (a1) is a production method including a step of dissolving a compound containing the constituent component B and the constituent component X, a compound containing the constituent component A, or the constituent component A and the constituent component X, the curable resin composition (2), and the capping ligand (1)-2 in a solvent x to obtain a solution g; and a step of mixing the obtained solution g with a solvent y in which the solubility of the perovskite compound therein is lower than that of the solvent x used in the step of obtaining the solution g.

The production method (a2) is a production method including a step of mixing a compound containing the constituent component B and the constituent component X, a compound containing the constituent component A, or the constituent component A and the constituent component X, the curable resin composition (2), the capping ligand (1)-2, and a solvent z at a high temperature and dissolving the semiconductor nanoparticle (1), the curable resin composition (2), and the capping ligand (1)-2 therein; and a step of cooling the obtained solution h, As a method for producing the composition that further contains the surface covering material (1)-3, the method for producing the composition containing semiconductor nanoparticles (1) and the curable resin composition (2) or the method for producing the composition containing semiconductor nanoparticles (1), the curable resin composition (2), and the solvent (3) can be used in the same manner as described above except that the surface covering material (1)-3 is mixed in any step included in the above-described production method.

<Film>

The ink composition according to the present embodiment can be used as an ink. Specifically, a film can be obtained by using the ink composition according to the present embodiment. For example, the film can be formed by coating a substrate with the ink composition according to the present embodiment using a known method such as a gravure coater, a dip coater, a reverse coater, a wire bar coater, a die coater, or an ink jet method and performing a curing treatment. The coating amount is appropriately in a range of 0.1 to 500 μm and preferably in a range of 0.5 to 300 μm in terms of a wet film thickness. Further, the average film thickness is in a range of 0.1 to 200 μm and preferably in a range of 20 to 150 μm in terms of a dry film thickness.

The film according to the present invention is a resin composition film obtained by applying the ink composition containing the semiconductor nanoparticles (1) and the curable resin composition (2) and curing the composition.

For example, the film is a film formed of the ink composition according to the present embodiment, in which the content ratio of the solvent (3) is 30% by mass or less and the total content ratio of the semiconductor nanoparticles (1), the curable resin composition (2), and the solvent (3) is 70% by mass or greater with respect to 100% by mass which is the total mass of the ink composition.

According to an aspect of the present invention, the film is a film formed of the ink composition, in which the content ratio of the solvent (3) is 25% by mass or less and the total content ratio of the semiconductor nanoparticles (1), the curable resin composition (2), and the solvent (3) is 70% by mass or greater with respect to 100% by mass which is the total mass of the ink composition.

The shape of the film is not particularly limited, and the film can be formed in an optional shape such as a sheet shape or a bar shape. In the present specification, the "bar shape" indicates a shape having an anisotropy. As the shape having an anisotropy, a shape of a plate having sides with different lengths is an exemplary example.

The thickness of the film may be in a range of 0.01 μm to 1000 mm, in a range of 0.1 μm to 10 mm, or in a range of 1 μm to 1 mm.

The thickness of the film in the present specification can be obtained by measuring the thicknesses of the film at optional three points using a micrometer and calculating the average value of the measured values.

The film may be formed of a single layer or a plurality of layers. In a case of a plurality of layers, the same kind of composition according to the embodiment may be used for each layer or different kinds of composition according to the embodiment may be used for each layer.

The film can be obtained as a film formed on a substrate according to the production methods (i) to (iii) for producing a laminated structure described below. Further, the film can be obtained by being peeled off from the substrate.

<Laminated Structure>

The laminated structure according to the present invention has a plurality of layers, and at least one layer is the above-described film.

Among the plurality of layers included in the laminated structure, examples of layers other than the above-described film include optional layers such as a substrate, a barrier layer, and a light scattering layer.

The shape of the film to be laminated is not particularly limited, and the film can be formed in an optional shape such as a sheet shape or a bar shape.

(Substrate)

The layer which may be included in the laminated structure according to the present invention is not particularly limited, and examples thereof include a substrate.

The substrate is not particularly limited and may be a film. From the viewpoint of extracting light at the time of light emission, a transparent substrate is preferable. As the substrate, a polymer such as polyethylene terephthalate or known substrates such as glass can be used.

For example, the above-described film may be provided on the substrate in the laminated structure.

FIG. 1 is a cross-sectional view schematically showing the configuration of the laminated structure according to the present embodiment. A film 10 according to the present embodiment may be provided between a first substrate 20 and a second substrate 21 in a first laminated structure 1a. The film 10 is sealed by a sealing layer 22.

According to one aspect of the present invention, the laminated structure 1a includes the first substrate 20, the second substrate 21, the film 10 according to the present embodiment which is positioned between the first substrate 20 and the second substrate 21, and the sealing layer 22 and is configured such that the sealing layer is disposed on a surface that does not contact with the first substrate 20 and the second substrate 21 of the film 10.

(Barrier Layer)

The layer which may be included in the laminated structure according to the present invention is not particularly limited, and examples thereof include a barrier layer. The laminated structure may include a barrier layer from the viewpoint that the barrier layer protects the above-described composition from water vapor in outside air or the air in the atmosphere.

The barrier layer is not particularly limited, and a transparent barrier layer is preferable from the viewpoint of extracting emitted light. For example, a polymer such as polyethylene terephthalate or a known barrier layer such as a glass film can be used as the barrier layer.

(Light Scattering Layer)

The layer which can be included in the laminated structure according to the present invention is not particularly limited, and examples thereof include a light scattering layer. From the viewpoint of efficiently utilizing incident light, the laminated structure may include a light scattering layer.

The light scattering layer is not particularly limited, and a transparent light scattering layer is preferable from the viewpoint of extracting emitted light. For example, light scattering particles such as silica particles or a known light scattering layer such as an amplified diffusion film can be used.

<Light-Emitting Device>

A light-emitting device according to the present invention can be obtained by combining the film according to the embodiment of the present invention or the laminated structure described above with a light source. The light-emitting device is a device that extracts light by irradiating the laminated structure or the film placed on the back stage with light emitted from the light source and allowing the composition or the laminated structure to emit light. Among a plurality of layers included in the laminated structure in the light-emitting device, examples of layers other than the film, the substrate, the barrier layer, and the light scattering layer include optional layers such as a light reflection member, a brightness-reinforcing film, a prism sheet, a light-guiding plate, and a medium material layer between elements.

According to one aspect of the present invention, a light-emitting device 2 is formed by laminating a prism sheet 50, a light-guiding plate 60, the first laminated structure 1a, and a light source 30 in this order.

(Light Source)

The light source constituting the light-emitting device according to the present invention is not particularly limited. However, from the viewpoint of allowing the film described above or the semiconductor nanoparticle containing the perovskite compound in the laminated structure to emit light, a light source having an emission wavelength of 600 nm or less is preferable. Examples of the light source include known light sources, for example, a light-emitting diode (LED) such as a blue light-emitting diode, a laser, and an EL.

(Light Reflection Member)

The layer which may be included in the laminated structure constituting the light-emitting device according to the present invention is not particularly limited, and examples thereof include a light reflection member. From the viewpoint of irradiating the composition described above or the laminated structure with light from the light source, the laminated structure may include the light reflection member. The light reflection member is not particularly limited and may be a reflective film.

Examples of the reflective film include known reflective films such as a reflecting mirror, a film formed of reflective particles, a reflective metal film, and a reflector.

(Brightness-Reinforcing Unit)

The layer which may be included in the laminated structure constituting the light-emitting device according to the present invention is not particularly limited, and examples thereof include a brightness-reinforcing unit. From the viewpoint of reflecting partial light to be returned to the direction in which the light is transmitted, the laminated structure may include the brightness-reinforcing unit.

(Prism Sheet)

The layer which may be included in the laminated structure constituting the light-emitting device according to the present invention is not particularly limited, and examples thereof include a prism sheet. A prism sheet typically includes a base material portion and a prism portion. Further, the base material portion may not be provided depending on a member adjacent to the base material portion. The prism sheet is obtained by being bonded to a member adjacent thereto through an optional appropriate adhesion layer (for example, an adhesive layer or a pressure-sensitive adhesive layer). The prism sheet is configured such that a plurality of unit prisms which become projections are arranged in parallel with one another on a side (rear side) opposite to a viewing side. Light transmitted through the prism sheet is likely to be focused by arranging the projections of the prism sheet toward the rear side. Further, in a case where the projections of the prism sheet are arranged toward the rear side, the quantity of light to be reflected without being incident on the prism sheet is small compared to a case where the projections are arranged toward the viewing side, and a display with high brightness can be obtained.

(Light-Guiding Plate)

The layer which may be included in the laminated structure constituting the light-emitting device according to the present invention is not particularly limited, and examples thereof include a light-guiding plate. As the light-guiding plate, an optional appropriate light-guiding plate such as a light-guiding plate in which a lens pattern is formed on the rear side such that light from the lateral direction can be deflected in the thickness direction or a light-guiding plate in which a prism shape or the like is formed on the rear side and/or the viewing side is used.

(Medium Material Layer Between Elements)

The layer which may be included in the laminated structure constituting the light-emitting device according to the present invention is not particularly limited, and examples thereof include a layer (medium material layer between elements) formed of one or more medium materials on an optical path between elements (layers) adjacent to each other.

One or more mediums included in the medium material layer between element are not particularly limited, and examples thereof include vacuum, air, gas, an optical material, an adhesive, an optical adhesive, glass, a polymer, a solid, a liquid, a gel, a curing material, an optical bonding material, a refractive index matching or refractive index mismatching material, a refractive index gradient material, a cladding or anti-gladding material, a spacer, a silica gel, a brightness-reinforcing material, a scattering or diffusing material, a reflective or anti-reflective material, a wavelength selective material, a wavelength selective anti-reflective material, a color filter, and suitable media known in the technical field.

Specific examples of the light-emitting device according to the present invention include those provided with wavelength conversion materials for an EL display and a liquid crystal display.

Specific examples thereof include a backlight (E1) (on-edge type backlight) that converts blue light to green light or red light by putting the composition of the present invention into a glass tube or the like so as to be sealed and disposing the glass tube or the like between a light-guiding plate and a blue light-emitting diode serving as a light source such that the glass tube or the like is along with an end surface (side surface) of the light-guiding plate; a backlight (E2) (surface-mounting type backlight) that converts blue light to be applied to a sheet after passing through a light-guiding plate from a blue light-emitting diode placed on an end surface (side surface) of the light-guiding plate to green light or red light by forming the sheet using the composition of the present invention and placing a film obtained by interposing the sheet between two barrier films so as to be sealed on the light-guiding plate; a backlight (E3) (on-chip type backlight) that converts blue light to be applied to green light or red light by dispersing the composition of the present invention in a resin or the like and placing the resin or the like in the vicinity of a light-emitting unit of a blue light-emitting diode; and a backlight (E4) is a backlight that converts blue light to be applied from a light source to green light or red light by dispersing the composition of the present invention in a resist and placing the resist on a color filter.

Examples of the light-emitting device include an illumination emitting white light, which is obtained by molding the composition according to the embodiment of the present invention, disposing the composition behind a blue light emitting diode serving as a light source, and converting blue light into green light or red light.

<Display>

Figure 2:
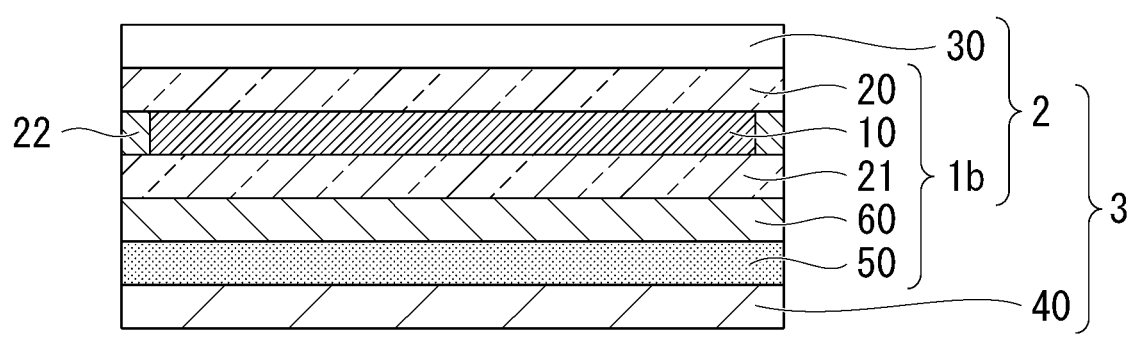
FIG. 2 is a cross-sectional view showing an embodiment of a display according to the present invention.

As shown in FIG. 2, a display 3 according to the present embodiment includes a liquid crystal panel 40 and the light-emitting device 2 described above in this order from the viewing side. The light-emitting device 2 includes a second laminated structure 1b and a light source 30. The second laminated structure 1b is formed of the first laminated structure 1a which further includes a prism sheet 50 and a light-guiding plate 60. The display may further include other appropriate optional members.

According to one aspect of the present invention, the display is the liquid crystal display 3 obtained by laminating the liquid crystal panel 40, the prism sheet 50, the light-guiding plate 60, the first laminated structure 1a, and the light source 30 in this order.

(Liquid Crystal Panel)

The liquid crystal panel typically includes a liquid crystal cell; a viewing-side polarizing plate disposed on a viewing side of the liquid crystal cell; and a rear-surface-side polarizing plate disposed on a rear surface side of the liquid crystal cell. The viewing-side polarizing plate and the rear-surface-side polarizing plate can be disposed such that respective absorption axes are substantially orthogonal or parallel to each other.

(Liquid Crystal Cell)

The liquid crystal cell includes a pair of substrates; and a liquid crystal layer serving as a display medium interposed between the substrates. In a typical configuration, a color filter and a black matrix are provided on one substrate. Further, a switching element that controls electro-optical characteristics of a liquid crystal; a scanning line that sends a gate signal to the switching element and a signal line that sends a source signal to the switching element; and a pixel electrode and a counter electrode are provided on the other substrate. The interval (cell gap) between the substrates can be controlled by a spacer or the like. For example, an alignment film formed of polyimide can be provided on a side of the substrate contact in the liquid crystal layer.

(Polarizing Plate)

The polarizing plate typically includes a polarizer; and a protective layer disposed on both sides of the polarizer.

Typically, the polarizer is an absorption type polarizer. As the polarizer, an appropriate optional polarizer is used. Examples thereof include a polarizer obtained by adsorbing a dichroic material such as iodine or a dichroic dye on a hydrophilic polymer film such as a polyvinyl alcohol-based film, a partially formalized polyvinyl alcohol-based film, or an ethylene-vinyl acetate copolymer-based partially saponified film so as to be uniaxially stretched; and a polyene-based alignment film such as a dehydrated product of polyvinyl alcohol or a dehydrochlorinated product of polyvinyl chloride. Among these, a polarizer obtained by adsorbing a dichroic material such as iodine on a polyvinyl alcohol-based film so as to be uniaxially stretched is particularly preferable from the viewpoint of a high dichroic ratio.

As the applications of the ink composition according to the present invention, a wavelength conversion material for a light-emitting diode (LED) is an exemplary example.

<LED>

The ink composition according to the present invention can be used as a material for a light-emitting layer of an LED.

As the LED containing the composition of the present invention, an LED which has a structure in which the ink composition of the present invention and conductive particles such as ZnS are mixed and laminated in a film shape, an n-type transport layer is laminated on one surface, and a p-type transport layer is laminated on the other surface and emits light by circulating the current so that positive holes of a p-type semiconductor and electrons of an n-type semiconductor cancel the charge in the particles in the semiconductor nanoparticle (1) and the curable resin composition (2) contained in the bonding surface of the composition is an exemplary example.

<Solar Cell>

The composition of the present invention can be used as an electron transport material contained in an active layer of a solar cell.

The configuration of the solar cell is not particularly limited, and examples thereof include a solar cell which includes a fluorine-doped tin oxide (FTO) substrate, a titanium oxide dense layer, a porous aluminum oxide layer, an active layer containing the composition of the present invention, a hole transport layer such as 2,2',7,7'-tetrakis-(N,N'-di-p-methoxyphenylamine)-9,9'-spirobifluorene (Spiro-MeOTAD), and a silver (Ag) electrode in this order.

The titanium oxide dense layer has a function of transporting electrons, an effect of suppressing the roughness of FTO, and a function of suppressing movement of inverse electrons.

The porous aluminum oxide layer has a function of improving the light absorption efficiency.

The composition of the present invention which is contained in the active layer plays a role of charge separation and electron transport.

<Method for Producing Laminated Structure>

A method for producing the laminated structure may be a method (i) including a step of coating a substrate with the ink composition according to the present invention, a step of removing the solvent, and a step of curing the curable resin composition in a case where the ink composition contains the solvent (3); a method (ii) including a step of coating a substrate with the ink composition according to the present invention and a step of curing the curable resin composition in a case where the ink composition does not contain the solvent (3); and a method (iii) including a step of laminating the film formed of the ink composition according to the present invention on a substrate.

Each step of coating a substrate with the composition, included in the production methods (i) and (ii) is not particularly limited and can be carried out using a known coating method such as a gravure coating method, a bar coating method, a printing method, a spray method, a spin coating method, a dip method, or a die coating method.

In the step of laminating the film on the substrate, included in the production method (iii), an optional adhesive can be used.

The adhesive is not particularly limited as long as the semiconductor nanoparticle (1) and a compound of the curable resin composition (2) are not dissolved therein, and a known adhesive can be used.

The method for producing a laminated structure may include a step of further laminating an optional film on the laminated structure obtained by the production methods (i) to (iii).

Examples of optional films to be laminated include a reflective film and a diffusion film.

An optional adhesive can be used in the step of laminating the film on the laminated structure. The above-described adhesive is not particularly limited as long as the semiconductor nanoparticle (1) and a compound of the curable resin composition (2) are not dissolved therein, and a known adhesive can be used.

<Method for Producing Light-Emitting Device>

A production method including a step of placing the light source, the composition on the optical path of a back stage from the light source, or the laminated structure is an exemplary example.

Further, the technical scope of the present invention is not limited to the above-described embodiments, and various modifications can be added within a range not departing from the spirit of the present invention.

EXAMPLES

Hereinafter, the embodiments of the present invention will be described in more detail based on examples and comparative example, but the present invention is not limited to the following examples.

<<Measurement of Emission Intensity>>

The emission intensity of the ink composition according to the present invention was measured with excitation light having a wavelength of 450 nm at room temperature in the atmosphere using an absolute PL quantum yield measuring device (for example, C9920-02, manufactured by Hamamatsu Photonics K. K.). The intensity of the excitation light was 5×10'.

<<Curability Test>>

The solvent resistance of the ink composition according to the present embodiment can be evaluated based on the following curability test.

A glass substrate having a size of 1 inch×1 inch and a thickness of 0.7 mm was subjected to a UV ozone treatment for 15 minutes. The glass substrate was drop-cast with each ink composition of Examples 1 to 6 and Comparative Example 4.

Next, a structure formed by stacking four sheets of slide glass having a size of 26 mm×76 mm and a thickness of 1 mm was disposed on each of both sides of the drop-cast glass substrate.

Next, an aluminum plate having a size of 50 mm×20 mm and a thickness of 0.35 mm was disposed in the form of a bridge using the structure as a foundation. At this time, the aluminum plate was placed such that half of the drop-cast surface was the shadow of the aluminum plate and the other half was not the shadow of the aluminum plate. In this manner, half of the surface of the glass substrate was irradiated with ultraviolet rays and the other half surface was not irradiated with ultraviolet rays.

Next, ultraviolet light was applied from the above using an ultraviolet light irradiation device (Spot Cure SP-9, manufactured by Ushio Lighting, Inc.). After the irradiation with ultraviolet light, the entire glass substrate was immersed in a toluene liquid (Wako Pure Chemical Industries, Ltd.). After the immersion, the glass substrate was taken out, and toluene was volatilized. The solvent resistance was evaluated by visual determination based on whether the cured product was held after the immersion of the toluene liquid.

Example 1

0.814 g of cesium carbonate, 40 mL of a solvent of 1-octadecene, and 2.5 mL of oleic acid were mixed. A cesium carbonate solution was prepared by stirring the solution using a magnetic stirrer and heating the resulting solution at 150° C. for 1 hour while circulating nitrogen.

0.276 g of lead bromide ($PbBr_2$) was mixed into 20 mL of a solvent of 1-octadecene. 2 mL of oleic acid and 2 mL of oleylamine were added to the solution after the solution was stirred using a magnetic stirrer and heated at a temperature of 120° C. for 1 hour while nitrogen was circulated, thereby preparing a lead bromide dispersion liquid.

The lead bromide dispersion liquid was heated to a temperature of 160° C., and 1.6 mL of the above-described cesium carbonate solution was added thereto. After the addition, a dispersion liquid was obtained by immersing a reaction container in ice water such that the temperature was decreased to room temperature.

Next, the dispersion liquid was centrifuged at 10000 rpm for 5 minutes to obtain a perovskite compound as a precipitate.

As the result of measurement performed on the X-ray diffraction pattern of the perovskite compound using an X-ray diffraction measuring device (XRD, Cu Kα ray, X'pert PRO MPD, manufactured by Spectris plc), it was confirmed that a peak derived from (hkl)=(001) at a position where 2θ was 14° and a three-dimensional perovskite type crystal structure were present.

As the result of observation of the Feret diameters of 20 particles of the perovskite compound, the average Feret diameter (average particle diameter) of the perovskite compound measured using a TEM (JEM-2200FS, manufactured by JEOL Ltd.) was 11 nm.

The obtained perovskite compound was dispersed in 5 mL of toluene to obtain a dispersion liquid containing the perovskite compound and the solvent.

0.29 mL of the dispersion liquid containing the perovskite compound and the solvent was centrifuged at 10000 rpm for 10 minutes to obtain a precipitate.

2.64 mL of lauryl methacrylate (Junsei Chemical Co., Ltd.) was added to the precipitate, and the resultant was stirred, thereby obtaining a lauryl methacrylate dispersion liquid. Next, an ink composition was obtained by adding 0.32 mL of trimethylolpropane trimethacrylate (TMPTM) and a photoinitiator (9.0 mg of Irgacure 819 and 18.3 mg of Irgacure 651) to the lauryl methacrylate dispersion liquid.

In the ink composition, the value of Z in Formula (a) was 0.15.

The obtained ink composition was stirred for 15 minutes using a magnetic stirrer.

Next, the emission intensity was measured. The emission intensity was $4.5 \times 10^6$.

Next, a glass substrate was drop-cast with the ink composition, and half of the area of the cast glass substrate was irradiated with ultraviolet light. The irradiation was carried out under conditions of an illuminance of 10 mW/cm² for an irradiation time of 90 seconds. The portion which had been irradiated with ultraviolet light was cured and the portion which had not been irradiated with ultraviolet light was removed by being rinsed with toluene.

Example 2

A dispersion liquid containing the perovskite compound and the solvent was obtained in the same manner as in Example 1. 0.52 mL of the dispersion liquid containing the perovskite compound and the solvent was centrifuged at 10000 rpm for 10 minutes to obtain a precipitate.

2.64 mL of tert-butyl methacrylate (Tokyo Chemical Industry Co., Ltd.) was added to the precipitate, and the resultant was stirred, thereby obtaining a tert-butyl methacrylate dispersion liquid. Next, an ink composition was obtained by adding 0.58 mL of TMPTM and a photoinitiator (16.3 mg of Irgacure 819 and 32.3 mg of Irgacure 651) to the tert-butyl methacrylate dispersion liquid.

In the ink composition, the value of Z in Formula (a) was 0.26.

The obtained ink composition was stirred for 15 minutes using a magnetic stirrer.

Next, the emission intensity was measured. The emission intensity was $3.8 \times 10^6$.

Next, a glass substrate was drop-cast with the ink composition, and half of the area of the cast glass substrate was irradiated with ultraviolet light. The irradiation was carried out under conditions of an illuminance of 10 mW/cm² for an irradiation time of 90 seconds. The portion which had been irradiated with ultraviolet light was cured and the portion which had not been irradiated with ultraviolet light was removed by being rinsed with toluene.

Example 3

A dispersion liquid containing the perovskite compound and the solvent was obtained in the same manner as in Example 1.

0.62 mL of the dispersion liquid containing the perovskite compound and the solvent was centrifuged at 10000 rpm for 10 minutes to obtain a precipitate.

2.64 mL of allyl methacrylate (Tokyo Chemical Industry Co., Ltd.) was added to the precipitate, and the resultant was stirred, thereby obtaining an allyl methacrylate dispersion liquid. Next, an ink composition was obtained by adding 0.69 mL of TMPTM and a photoinitiator (19.1 mg of Irgacure 819 and 38.9 mg of Irgacure 651) to the allyl methacrylate dispersion liquid.

In the ink composition, the value of Z in Formula (a) was 0.29.

The obtained ink composition was stirred for 15 minutes using a magnetic stirrer.

Next, the emission intensity was measured. The emission intensity was $3.5 \times 10^6$.

Next, a glass substrate was drop-cast with the ink composition, and half of the area of the cast glass substrate was irradiated with ultraviolet light. The irradiation was carried out under conditions of an illuminance of 10 mW/cm² for an irradiation time of 120 seconds. The portion which had been irradiated with ultraviolet light was cured and the portion which had not been irradiated with ultraviolet light was removed by being rinsed with toluene.

Example 4

A dispersion liquid containing the perovskite compound and the solvent was obtained in the same manner as in Example 1.

0.71 mL of the dispersion liquid containing the perovskite compound and the solvent was centrifuged at 10000 rpm for 10 minutes to obtain a precipitate.

2.64 mL of vinyl methacrylate (Tokyo Chemical Industry Co., Ltd.) was added to the precipitate, and the resultant was stirred, thereby obtaining a vinyl methacrylate dispersion liquid. Next, an ink composition was obtained by adding 0.71 mL of TMPTM and a photoinitiator (21.9 mg of Irgacure 819 and 44.0 mg of Irgacure 651) to the vinyl methacrylate dispersion liquid.

In the ink composition, the value of Z in Formula (a) was 0.33.

The obtained ink composition was stirred for 15 minutes using a magnetic stirrer.

Next, the emission intensity was measured. The emission intensity was $3.3 \times 10^6$.

Next, a glass substrate was drop-cast with the ink composition, and half of the area of the cast glass substrate was irradiated with ultraviolet light. The irradiation was carried out under conditions of an illuminance of 10 mW/cm$^2$ for an irradiation time of 180 seconds. The portion which had been irradiated with ultraviolet light was cured and the portion which had not been irradiated with ultraviolet light was removed by being rinsed with toluene.

Example 5

0.814 g of cesium carbonate, 40 mL of a solvent of 1-octadecene, and 2.5 mL of oleic acid were mixed. A cesium carbonate solution was prepared by stirring the solution using a magnetic stirrer and heating the resulting solution at 150° C. for 1 hour while circulating nitrogen.

0.276 g of lead bromide (PbBr$_2$) was mixed into 20 mL of a solvent of 1-octadecene. 2 mL of oleic acid and 2 mL of oleylamine were added to the solution after the solution was stirred using a magnetic stirrer and heated at a temperature of 120° C. for 1 hour while nitrogen was circulated, thereby preparing a lead bromide dispersion liquid.

The lead bromide dispersion liquid was heated to a temperature of 160° C., and 1.6 mL of the above-described cesium carbonate solution was added thereto. After the addition, a dispersion liquid was obtained by immersing a reaction container in ice water such that the temperature was decreased to room temperature.

Next, the dispersion liquid was centrifuged at 10000 rpm for 5 minutes to obtain a perovskite compound as a precipitate.

As the result of measurement performed on the X-ray diffraction pattern of the perovskite compound using an X-ray diffraction measuring device (XRD, Cu Kα ray, X'pert PRO MPD, manufactured by Spectris plc), it was confirmed that a peak derived from (hkl)=(001) at a position where 2θ was 14° and a three-dimensional perovskite type crystal structure were present.

As the result of observation of the Feret diameters of 20 particles of the perovskite compound, the average Feret diameter (average particle diameter) of the perovskite compound measured using a TEM (JEM-2200FS, manufactured by JEOL Ltd.) was 11 nm.

The obtained perovskite compound was dispersed in 5 mL of toluene to obtain a dispersion liquid containing the perovskite compound and the solvent.

Next, 600 μL of an organopolysilazane (Durazane 1500 Slow Cure, manufactured by Merck Performance Materials Ltd.) was mixed into 3 mL of the dispersion liquid containing the perovskite compound and the solvent.

The dispersion liquid containing the perovskite compound and the solvent was subjected to a modification treatment for 1 day while being stirred using a stirrer at 25° C. under a humidity condition of 80%.

0.29 mL of the dispersion liquid which had been subjected to the modification treatment was centrifuged at 10000 rpm for 10 minutes to obtain a precipitate.

2.64 mL of lauryl methacrylate (Junsei Chemical Co., Ltd.) was added to the precipitate, and the resultant was stirred, thereby obtaining a lauryl methacrylate dispersion liquid. Next, an ink composition was obtained by adding 0.32 mL of TMPTM and a photoinitiator (8.8 mg of Irgacure 819 and 17.7 mg of Irgacure 651) to the lauryl methacrylate dispersion liquid.

In the ink composition, the value of Z in Formula (a) was 0.15.

The obtained ink composition was stirred for 15 minutes using a magnetic stirrer.

Next, the emission intensity was measured. The emission intensity was $4.5 \times 10^6$.

Next, a glass substrate was drop-cast with the mixed dispersion liquid, and half of the area of the cast glass substrate was irradiated with ultraviolet light. The irradiation was carried out under conditions of an illuminance of 10 mW/cm$^2$ for an irradiation time of 90 seconds. The portion which had been irradiated with ultraviolet light was cured and the portion which had not been irradiated with ultraviolet light was removed by being rinsed with toluene.

Comparative Example 1

0.814 g of cesium carbonate, 40 mL of a solvent of 1-octadecene, and 2.5 mL of oleic acid were mixed. A cesium carbonate solution was prepared by stirring the solution using a magnetic stirrer and heating the resulting solution at 150° C. for 1 hour while circulating nitrogen.

0.276 g of lead bromide (PbBr$_2$) was mixed into 20 mL of a solvent of 1-octadecene. 2 mL of oleic acid and 2 mL of oleylamine were added to the solution after the solution was stirred using a magnetic stirrer and heated at a temperature of 120° C. for 1 hour while nitrogen was circulated, thereby preparing a lead bromide dispersion liquid.

The lead bromide dispersion liquid was heated to a temperature of 160° C., and 1.6 mL of the above-described cesium carbonate solution was added thereto. After the addition, a dispersion liquid was obtained by immersing a reaction container in ice water such that the temperature was decreased to room temperature.

Next, the dispersion liquid was centrifuged at 10000 rpm for 5 minutes to obtain a perovskite compound as a precipitate.

As the result of measurement performed on the X-ray diffraction pattern of the perovskite compound using an X-ray diffraction measuring device (XRD, Cu Kα ray, X'pert PRO MPD, manufactured by Spectris plc), it was confirmed that a peak derived from (hkl)=(001) at a position where 2θ was 14° and a three-dimensional perovskite type crystal structure were present.

As the result of observation of the Feret diameters of 20 particles of the perovskite compound, the average Feret diameter (average particle diameter) of the perovskite compound measured using a TEM (JEM-2200FS, manufactured by JEOL Ltd.) was 11 nm.

The obtained perovskite compound was dispersed in 5 mL of toluene to obtain a dispersion liquid containing the perovskite compound and the solvent.

0.80 mL of the dispersion liquid containing the perovskite compound and the solvent was centrifuged at 10000 rpm for 10 minutes to obtain a precipitate.

2.64 mL of methyl methacrylate (Tokyo Chemical Industry Co., Ltd.) was added to the precipitate, and the resultant was stirred, thereby obtaining a methyl methacrylate dispersion liquid. Next, an ink composition was obtained by adding 0.88 mL of TMPTM and a photoinitiator (24.7 mg of Irgacure 819 and 49.4 mg of Irgacure 651) to the methyl methacrylate dispersion liquid.

In the ink composition, the value of Z in Formula (a) was 0.38.

The obtained ink composition was stirred for 15 minutes using a magnetic stirrer.

Next, the emission intensity was measured. The emission intensity was $2.5 \times 10^5$.

Comparative Example 2

A dispersion liquid containing the perovskite compound and the solvent was obtained in the same manner as in Comparative Example 1.

0.45 mL of the dispersion liquid containing the perovskite compound and the solvent was centrifuged at 10000 rpm for 10 minutes to obtain a precipitate.

2.64 mL of ethylene glycol dimethacrylate (Tokyo Chemical Industry Co., Ltd.) was added to the precipitate, and the resultant was stirred, thereby obtaining an ethylene glycol dimethacrylate dispersion liquid. Next, an ink composition was obtained by adding 0.50 mL of TMPTM and a photoinitiator (13.9 mg of Irgacure 819 and 27.7 mg of Irgacure 651) to the ethylene glycol dimethacrylate dispersion liquid.

In the ink composition, the value of Z in Formula (a) was 0.39.

The obtained ink composition was stirred for 15 minutes using a magnetic stirrer.

Next, the emission intensity was measured. The emission intensity was $1.0 \times 10^5$.

Comparative Example 3

A dispersion liquid containing the perovskite compound and the solvent was obtained in the same manner as in Comparative Example 1. 0.61 mL of the dispersion liquid containing the perovskite compound and the solvent was centrifuged at 10000 rpm for 10 minutes to obtain a precipitate.

2.64 mL of Karenz MOI (chemical name: 2-isocyanatoethyl methacrylate) (Showa Denko K. K.) was added to the precipitate, and the resultant was stirred, thereby obtaining a Karenz MOI dispersion liquid. Next, an ink composition was obtained by adding 0.63 mL of TMPTM and a photoinitiator (18.7 mg of Irgacure 819 and 37.0 mg of Irgacure 651) to the Karenz MOI dispersion liquid.

In the ink composition, the value of Z in Formula (a) was 0.56.

The obtained ink composition was stirred for 15 minutes using a magnetic stirrer.

Next, the emission intensity was measured. The emission intensity was $7.4 \times 10^5$.

Comparative Example 4

0.814 g of cesium carbonate, 40 mL of a solvent of 1-octadecene, and 2.5 mL of oleic acid were mixed. A cesium carbonate solution was prepared by stirring the solution using a magnetic stirrer and heating the resulting solution at 150° C. for 1 hour while circulating nitrogen.

0.276 g of lead bromide ($PbBr_2$) was mixed into 20 mL of a solvent of 1-octadecene. 2 mL of oleic acid and 2 mL of oleylamine were added to the solution after the solution was stirred using a magnetic stirrer and heated at a temperature of 120° C. for 1 hour while nitrogen was circulated, thereby preparing a lead bromide dispersion liquid.

The lead bromide dispersion liquid was heated to a temperature of 160° C., and 1.6 mL of the above-described cesium carbonate solution was added thereto. After the addition, a dispersion liquid was obtained by immersing a reaction container in ice water such that the temperature was decreased to room temperature.

Next, the dispersion liquid was centrifuged at 10000 rpm for 5 minutes to obtain a perovskite compound as a precipitate.

As the result of measurement performed on the X-ray diffraction pattern of the perovskite compound using an X-ray diffraction measuring device (XRD, Cu Kα ray, X'pert PRO MPD, manufactured by Spectris plc), it was confirmed that a peak derived from (hkl)=(001) at a position where 2θ was 14° and a three-dimensional perovskite type crystal structure were present.

As the result of observation of the Feret diameters of 20 particles of the perovskite compound, the average Feret diameter (average particle diameter) of the perovskite compound measured using a TEM (JEM-2200FS, manufactured by JEOL Ltd.) was 11 nm.

The obtained perovskite compound was dispersed in 5 mL of toluene to obtain a dispersion liquid containing the perovskite compound and the solvent.

500 μL of the dispersion liquid was taken out and re-dispersed in 4.5 mL of toluene to obtain a dispersion liquid containing the perovskite compound and the solvent.

Next, a methacrylic resin (PMMA, manufactured by Sumitomo Chemical Co., Ltd., SUMIPEX methacrylic resin, MH, molecular weight of approximately 120000, specific gravity of 1.2 g/mL) was mixed with a toluene such that the amount of PMMA reached 16.5% by mass with respect to the total mass of the methacrylic resin and toluene, and the solution was heated at 60° C. for 3 hours to obtain a solution in which the polymer was dissolved.

0.1 mL of the dispersion liquid containing the perovskite compound and the solvent was mixed with 5.83 mL of a solution (5.10 ml of toluene, 0.73 ml of PMMA) in which the polymer had been dissolved to obtain a PMMA-toluene dispersion liquid (ink composition).

In the ink composition, the value of Z in Formula (a) was 0.05.

Next, a glass substrate was drop-cast with the mixed dispersion liquid, and half of the area of the cast glass substrate was irradiated with ultraviolet light. The irradiation was carried out under conditions of an illuminance of 10 mW/cm² for an irradiation time of 300 seconds. The portion which had been irradiated with ultraviolet light was not cured, and both the portion which had not been irradiated with ultraviolet light and the portion which had been irradiated with ultraviolet light were removed by being rinsed with toluene.

Example 6

0.814 g of cesium carbonate, 40 mL of a solvent of 1-octadecene, and 2.5 mL of oleic acid were mixed. A cesium carbonate solution was prepared by stirring the solution using a magnetic stirrer and heating the resulting solution at 150° C. for 1 hour while circulating nitrogen.

0.276 g of lead bromide ($PbBr_2$) was mixed into 20 mL of a solvent of 1-octadecene. 2 mL of oleic acid and 2 mL of oleylamine were added to the solution after the solution was stirred using a magnetic stirrer and heated at a temperature of 120° C. for 1 hour while nitrogen was circulated, thereby preparing a lead bromide dispersion liquid.

The lead bromide dispersion liquid was heated to a temperature of 160° C., and 1.6 mL of the above-described cesium carbonate solution was added thereto. After the addition, a dispersion liquid was obtained by immersing a reaction container in ice water such that the temperature was decreased to room temperature.

Next, the dispersion liquid was centrifuged at 10000 rpm for 5 minutes to obtain a dispersion liquid containing the perovskite compound and the solvent as a precipitate.

0.29 mL of the dispersion liquid containing the perovskite compound and the solvent was centrifuged at 10000 rpm for 10 minutes so that the precipitate was separated to obtain the precipitate.

2.10 mL of lauryl methacrylate (Junsei Chemical Co., Ltd.) was added to the precipitate, and the resultant was stirred, thereby obtaining a lauryl methacrylate dispersion liquid. Next, an ink composition whose content ratio of toluene serving as a solvent was 20% by mass was obtained by adding 0.25 mL of TMPTM and a photoinitiator (7.0 mg of Irgacure 819 and 14.1 mg of Irgacure 651) to the lauryl methacrylate dispersion liquid and further adding 0.61 mL of toluene thereto.

In the ink composition, the value of Z in Formula (a) was 0.19.

The obtained ink composition was stirred for 15 minutes using a magnetic stirrer.

Next, the emission intensity was measured. The emission intensity was $4.4 \times 10^6$.

Next, a glass substrate was drop-cast with the ink composition, and half of the area of the cast glass substrate was irradiated with ultraviolet light. The irradiation was carried out under conditions of an illuminance of 10 mW/cm² for an irradiation time of 90 seconds. The portion which had been irradiated with ultraviolet light was cured and the portion which had not been irradiated with ultraviolet light was removed by being rinsed with toluene.

TABLE 1

| | Name of curable resin | Curable resin [ml] | TMPTM [ml] | Dispersion liquid [ml] | Toluene [ml] | Modification treatment | Emission intensity | Curability | Z |
|---|---|---|---|---|---|---|---|---|---|
| Example 1 | Lauryl methacrylate | 2.64 | 0.32 | 0.29 | 0 | Not performed | $4.5 \times 10^6$ | Present | 0.15 |
| Example 2 | tert-Butyl methacrylate | 2.64 | 0.58 | 0.52 | 0 | Not performed | $3.8 \times 10^6$ | Present | 0.26 |
| Example 3 | Allyl methacrylate | 2.64 | 0.69 | 0.62 | 0 | Not performed | $3.5 \times 10^6$ | Present | 0.29 |
| Example 4 | Vinyl methacrylate | 2.64 | 0.71 | 0.71 | 0 | Not performed | $3.3 \times 10^6$ | Present | 0.33 |
| Example 5 | Lauryl methacrylate | 2.64 | 0.32 | 0.29 | 0 | Performed | $4.5 \times 10^6$ | Present | 0.15 |
| Comparative Example 1 | Methyl methacrylate | 2.64 | 0.88 | 0.80 | 0 | Not performed | $2.5 \times 10^5$ | | 0.38 |
| Comparative Example 2 | Ethylene glycol dimethacrylate | 2.64 | 0.5 | 0.45 | 0 | Not performed | $1.0 \times 10^5$ | | 0.39 |
| Comparative Example 3 | Karenz MOI | 2.64 | 0.63 | 0.61 | 0 | Not performed | $7.4 \times 10^5$ | | 0.56 |
| Comparative Example 4 | PMMA-toluene dispersion liquid | 0.73 | 0 | 0.10 | 5.10 | Not performed | | Not present | 0.05 |
| Example 6 | Lauryl methacrylate | 2.10 | 0.25 | 0.29 | 0.61 | Not performed | $4.4 \times 10^6$ | Present | 0.19 |

INDUSTRIAL APPLICABILITY

According to the present invention, it is possible to provide an ink composition with excellent light-emitting characteristics and excellent solvent resistance, a film formed of the composition, and a display obtained by using the composition.

Therefore, the ink composition of the present invention, the film formed of the composition, and the display obtained by using the composition can be suitably used for light emission.

REFERENCE SIGNS LIST

1a: first laminated structure
1b: second laminated structure
10: film
20: first substrate
21: second substrate
22: sealing layer
2: light-emitting device
3: display
30: light source
40: liquid crystal panel
50: prism sheet
60: light-guiding plate

The invention claimed is:

1. An ink composition comprising:
a semiconductor nanoparticle (1) which contains a perovskite compound; and
a curable resin composition (2),
wherein the perovskite compound in the semiconductor nanoparticle (1) is represented by Formula (P1), $$ABX(3+\delta)(-0.7 \leq \delta \leq 0.7) \tag{P1}$$

wherein A indicates a component positioned at each vertex of a hexahedron having a component B at a center in a perovskite type crystal structure and is at least one monovalent cation selected from the group consisting of a cesium ion, an organic ammonium ion, and an amidinium ion, X indicates a component positioned at each vertex of an octahedron having a component B at a center in the perovskite type crystal structure and is at least one anion selected from the group consisting of a chloride ion, a bromide ion, a fluoride ion, an iodide ion, and a thiocyanate ion, and B indicates a component positioned at centers of the hexahedron where the component A is disposed at each vertex and the octahedron where the component X is disposed at each vertex in the perovskite type crystal structure and is at least one metal ion selected from the group consisting of a lead ion and a tin ion;

wherein the curable resin composition (2) comprises at least one of a (meth)acrylate monomer and a (meth)acrylate polymer;

wherein the ink composition may further comprise a solvent (3), a value of Z in Formula (a) is 0.37 or less, $$Z=(O2+O3+N2+N3)/(C2+C3) \quad \text{Formula (a):}$$

wherein O2, N2, and C2 represent the number of O atoms, the number of N atoms, and the number of C atoms, respectively, in the curable resin composition (2), and O3, N3, and C3 represent the number of O atoms, the number of N atoms, and the number of C atoms, respectively in the solvent (3), wherein, in a case where the ink composition does not contain the solvent (3), O3, N3, and C3 each represent 0.

2. The ink composition according to claim 1, wherein the curable resin composition (2) contains at least one selected from the group consisting of a low-molecular-weight compound represented by Formula (b-1) and a polymer having a repeating unit represented by Formula (b-2), and a total content ratio of the low-molecular-weight compound and the polymer is 50% by mass or greater in a case where a total mass of the curable resin composition (2) is set to 100% by mass

(b-1)

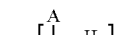

(b-2)

(in Formulae (b-1) and (b-2), A represents a hydrogen atom or a methyl group, m1 represents an integer of 0 to 20, m2 represents an integer of 0 to 2, m3 represents an integer of 0 to 20, m4 represents an integer of 0 to 2, m5 represents an integer of 0 to 20, and a total value of m1 to m5 is 20 or less, Ra represents a methylene group, Rb represents a divalent group represented by any of Formulae (b-31) to (b-38), and in a case where a plurality of Rb's are present, Rb's may be the same as or different from one another, and

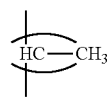
(b-31)

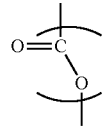
(b-32)

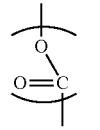
(b-33)

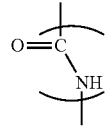
(b-34)

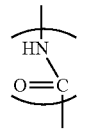
(b-35)

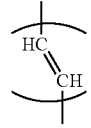
(b-36)

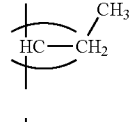
(b-37)

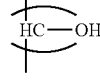
(b-38)

Rc represents a monovalent group represented by any of Formulae (b-41) to (b-48))

(b-41)

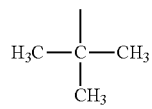
(b-42)

(b-43)

-continued

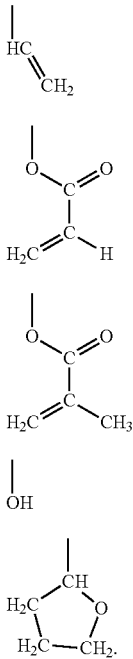

(b-44)

(b-45)

(b-46)

(b-47)

(b-48)

3. The ink composition according to claim 2, wherein the polymer having a repeating unit represented by Formula (b-2) is a polymer which has 50% by mole or greater of the repeating unit represented by Formula (b-2) in a case where a total amount of repeating units in the polymer is set to 100% by mole.

4. The ink composition according to claim 1, wherein the curable resin composition (2) is a photocurable resin composition.

5. The ink composition according to claim 1, wherein in a case where a total mass of the ink composition is set to 100% by mass, a content ratio of the solvent (3) is 25% by mass or less, and a total content ratio of the semiconductor nanoparticle (1), the curable resin composition (2), and the solvent (3) is 70% by mass or greater.

6. A film which is obtained by curing the ink composition according to claim 4.

7. A display comprising:
the film according to claim 6.

8. The ink composition according to claim 1, wherein Z is in a range of 0.15 to 0.37.

9. The ink composition according to claim 1, wherein Z is in a range of 0.15 to 0.33.

10. The ink composition according to claim 1, wherein an emission intensity of the ink composition is $3.3 \times 10^6$ or more, as measured with excitation light having a wavelength of 450 nm at room temperature in an atmosphere using an absolute PL quantum yield measuring device, wherein an intensity of the excitation light is $5 \times 10^7$, and wherein the ink composition has a solvent resistance evaluated by a curability test implemented as follows: a glass substrate having a size of 1 inch×1 inch and a thickness of 0.7 mm is subjected to a UV ozone treatment for 15 minutes; the glass substrate is drop-cast with the ink composition; a structure formed by stacking four sheets of slide glass having a size of 26 mm×76 mm and a thickness of 1 mm is disposed on each of both sides of the drop-cast glass substrate; an aluminum plate having a size of 50 mm×20 mm and a thickness of 0.35 mm is disposed in the form of a bridge using the structure as a foundation, wherein the aluminum plate is placed such that half of the drop-cast surface is a shadow of the aluminum plate and another half is not a shadow of the aluminum plate, so as to allow half of the surface of the glass substrate to be irradiated with ultraviolet light, while not allowing another half surface to be irradiated with ultraviolet light in a subsequent step; ultraviolet light is applied from above using an ultraviolet light irradiation device; after irradiation with ultraviolet light, whole of the glass substrate is immersed in a toluene liquid; the glass substrate is taken out, and toluene is volatilized; and the solvent resistance is evaluated by visual determination, wherein the solvent resistance of the ink composition is confirmed by presence of a cured product remaining after immersion in the toluene liquid.

* * * * *